US00RE49574E

(19) United States
(12) Reissued Patent
Wang

(10) Patent Number: US RE49,574 E
(45) Date of Reissued Patent: Jul. 11, 2023

(54) BIDIRECTIONAL MECHANICAL CONVERTING UNIT

(71) Applicant: Weiyi Wang, Zhejiang (CN)

(72) Inventor: Weiyi Wang, Zhejiang (CN)

(73) Assignees: HANGZHOU GREAT STAR INDUSTRIAL CO., LTD., Hangzhou (CN); RATCHET SOLUTIONS, INC., Auburn, WA (US)

(21) Appl. No.: 15/782,432

(22) Filed: Oct. 12, 2017

Related U.S. Patent Documents

Reissue of:
(64) Patent No.: 9,156,145
Issued: Oct. 13, 2015
Appl. No.: 13/255,187
PCT Filed: Sep. 1, 2011
PCT No.: PCT/CN2011/079246
§ 371 (c)(1),
(2) Date: Sep. 8, 2011
PCT Pub. No.: WO2013/004045
PCT Pub. Date: Jan. 10, 2013

(30) Foreign Application Priority Data

Jul. 7, 2011 (CN) ..... 201110189889.9

(51) Int. Cl.
*B25B 15/04* (2006.01)

(52) U.S. Cl.
CPC ..... *B25B 15/04* (2013.01)

(58) Field of Classification Search
CPC ..... B25B 15/04
(Continued)

(56) References Cited

U.S. PATENT DOCUMENTS 3,983,759 A * 10/1976 Linden ..... 74/88
4,426,895 A * 1/1984 Lack ..... 81/57.39
(Continued)

FOREIGN PATENT DOCUMENTS

CN 87101181 A 6/1988
CN 2283550 Y 6/1998
(Continued)

*Primary Examiner* — Russell D Stormer
(74) *Attorney, Agent, or Firm* — Andrus Intellectual Property Law, LLP

(57) ABSTRACT

[The present invention discloses a] *A* bidirectional mechanical converting unit[, comprising] *includes*: a main shaft; a driving mechanism, which including a driving [means] *assembly* and a reversing [means] *assembly* which are coupled to each other; and a rotation [means] *assembly* for inputting torque, an rotation axis of the rotation [means] *assembly* being coaxial with the main shaft, the rotation [means] *assembly* and the driving mechanism being coupled to each other, and the driving mechanism delivering the torque to output at the main shaft at a predetermined direction, no matter in which direction the rotation [means] *assembly* rotates; wherein the predetermined direction can be switched via the reversing [means] *assembly*. [The present invention is simple structured, not only can efficiently utilizes the movements of the rotation means in either way, but also can switch the rotation direction of the output shaft conveniently upon demand, with easy operations.]

16 Claims, 14 Drawing Sheets

(58) Field of Classification Search
USPC ..... 81/57.39, 57.29, 57.3, 57.31
See application file for complete search history.

(56) References Cited

U.S. PATENT DOCUMENTS

| | | | | | |
|---|---|---|---|---|---|
| 4,474,089 | A | * | 10/1984 | Scott | 81/57.29 |
| 4,970,915 | A | | 11/1990 | Williams, III | |
| 5,058,463 | A | * | 10/1991 | Wannop | 81/57.29 |
| 5,136,888 | A | * | 8/1992 | Nix | B65B 13/305 74/88 |
| 5,662,009 | A | * | 9/1997 | Palmer | B25B 13/461 475/221 |
| 5,784,934 | A | | 7/1998 | Izumisawa | B25B 21/00 81/57.26 |
| 5,881,609 | A | * | 3/1999 | Palmer | F16H 31/002 74/810.1 |
| 5,931,062 | A | * | 8/1999 | Marcovici | 81/57.31 |
| 6,112,621 | A | | 9/2000 | Ochiai | |
| 6,330,843 | B1 | | 12/2001 | Lin | |
| 6,450,067 | B1 | | 9/2002 | Liao | |
| 8,707,831 | B2 | * | 4/2014 | Palmer | B25B 13/467 81/57.29 |
| 2010/0010845 | A1 | | 5/2010 | Takada et al. | |
| 2010/0108454 | A1 | | 5/2010 | Takada et al. | |

FOREIGN PATENT DOCUMENTS

| | | | |
|---|---|---|---|
| CN | 2775339 | Y | 4/2006 |
| CN | 1280552 | C | 10/2006 |
| CN | 1864936 | A | 11/2006 |
| CN | 101680514 | A | 3/2010 |
| CN | 101890688 | A | 11/2010 |
| CN | 102059674 | | 5/2011 |
| CN | 202292572 | U | 7/2012 |
| JP | 2010216536 | | 9/2010 |
| JP | 5517146 | B2 | 6/2014 |

* cited by examiner

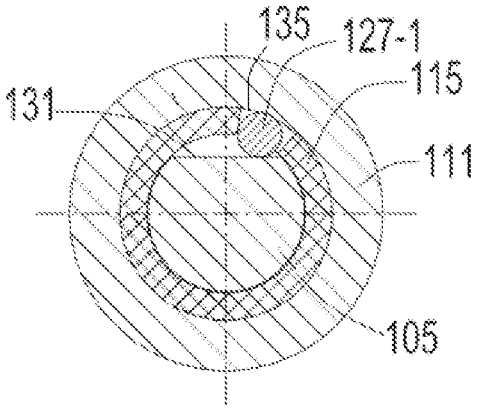
Fig 8C
Amended
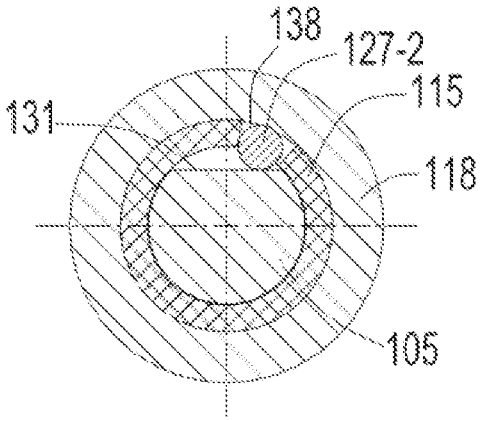
Fig 8D
Amended

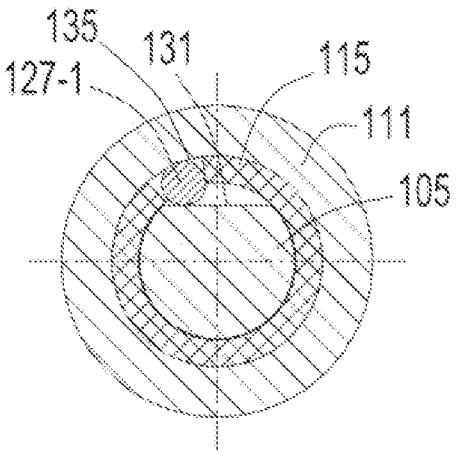
Fig 9C
Amended
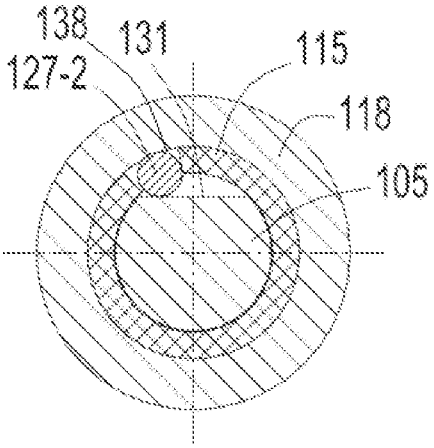
Fig 9D
Amended

BIDIRECTIONAL MECHANICAL CONVERTING UNIT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

The present application is the U.S. national stage application of International Application PCT/CN2011/079246, filed Sep. 7, 2011. The International Application claims priority of Chinese Patent Application 201110189889.9, filed Jul. 7, 2011, the contents of which are incorporated herein by reference in their entireties.

TECHNICAL FIELD OF THE INVENTION

The present invention relates to a manual tool, and more particularly, to a mechanical converting unit which efficiently utilizes the bidirectional rotations of a driving means.

BACKGROUND OF THE INVENTION

During the using of common manual tools such as screwdrivers and torque wrenches, there is a movement limitation of the human hand in rotation direction, namely the inability of the human hand to turn continuously in one direction. The operation of such a tool whose rotation axis of the handle is coaxial with the tool's main shaft consists of a repetition of the following cycle: first, the hand rotates the handle in the desirable direction (e.g., tightening or loosening a screw); second, the hand rotates in the opposite direction to reposition the tool for next cycle. During the second portion of the above mentioned cycle, the band's reversed rotation can be achieved by re-grasping the handle after releasing it, or by the tool which is equipped with a one-way means such as a ratchet to keep the main shaft stationary during the reversed rotation of the handle, or by re-inserting the tool bit to the screw after extracting the bit from engagement with the screw. However, in any case, the hand's reversed rotation could not bring any effective advance of the fastener, and therefore it becomes a wasted movement. U.S. Pat. No. 5,931,062 discloses a mechanical rectifier, which comprises a shaft; two driving elements mounted on the shaft, each having a one-way clutch interposed between it and the shaft, with the clutches oriented in the same way on the shaft so that the shaft is always entrained in only one direction of rotation when either one of the two driving elements is rotated in that direction, and the shaft is overrun by a driving element that is rotated in the opposite direction; a rotation means positioned along the axis of the shaft and engaging a selected one of the driving elements; and a reversing mechanism coupling the two driving elements together and forcing them to always rotate in opposite directions so that one driving element entrains the shaft and the other driving element overruns the shaft, thus causing the shalt to always turn in only one direction, regardless of the direction of rotation of the driving elements, so that transfers the bidirectional rotations of the rotation means (e.g., a handle) into the unidirectional rotation of the shaft. This mechanical rectifier can efficiently utilizes the rotations of the rotation means in either way, i.e., no matter the handle rotates clockwise or counterclockwise, the shat rotates in a same direction, therefore it can improve the efficiency of hand motion, and save operation time.

However, the converting mechanism of that invention can only make the shaft rotate in one direction. To meet the requirement of rotating the shaft in two ways (e.g., tightening or loosening a fastener in the application of a screwdriver), the handle of that invention must be able to be removed from the shaft which is coaxial with it, and the two ends of the shaft (assumed to be end A and end B) should be able to adapt with tool bits. Assuming end A is used to tighten a fastener in the beginning, in order to loose this fastener, the handle mounted on end B of the shaft must be removed from the shaft, then people should re-mount the handle to end A of the shat, insert a suitable tool bit on end B, and then start the fastener-loosing action. If the fastener to be loosed is the same type as the one being tightened in the beginning, the tool bit must be removed from end A before the handle re-mounting, and be inserted to end B. It is obvious that the direction-switching of the shat is very inconvenient. It is even troublesome to replace the bit to the two ends of the shaft for multi-purpose screwdrivers with replaceable bits. Furthermore, it means the integrity of the whole screwdriver itself can not be ensured and its parts are easy to get lost, to assure the handle can be removed from the shaft easily.

Therefore, it is desired to develop a bidirectional mechanical converting unit which can switch the rotation direction of the shaft conveniently.

SUMMARY OF THE INVENTION

In view of the above, the technical object of the present invention is to provide a bidirectional mechanical converting unit which can switch the rotation direction of the main shaft conveniently.

For the above purpose, the present invention provides a bidirectional mechanical converting unit, comprises: a main shaft; a driving mechanism, which includes a driving means and a reversing means which are coupled to each other and a rotation means for inputting torque, an rotation axis of the rotation means being coaxial with the main shaft, the rotation means and the driving mechanism being coupled to each other, and the driving mechanism delivering the torque to output at the main shaft in a predetermined direction, no matter in which direction the rotation means rotates; wherein the predetermined direction can be switched via the reversing means.

Further, the driving means is sleeved on the reversing means; the driving means includes two driving elements mounted on the main shaft, each having a one-way clutch interposed between it and the main shaft, and a transmission structure coupling the two driving elements and forcing them to rotate in opposite directions; wherein the two driving elements are spaced apart axially, the reversing means includes the one-way clutches; both of the one-way clutches are functionally oriented in a same direction, so that the main shaft is entrained with one of the two driving elements which is rotating in the direction, and the main shaft is overrun by the other driving element which is rotating in the opposite direction.

In one embodiment of the bidirectional mechanical converting unit of the present invention, the two driving elements are a capstan gear and a follower gear respectively; the transmission structure includes at least one idle gear axle perpendicular to the main shaft, at least one idle gear is disposed on the idle gear axle and engaged with the capstan gear and the follower gear together, so that the capstan gear and the follower gear rotate in opposite directions; and the capstan gear is fixedly coupled with the rotation means. Further, the capstan gear, the follower gear and the idle gear are bevel gears. Even further, the transmission structure includes two idle gear axles perpendicular to the main shaft; two idle gears are disposed on the idle gear axles respectively and engaged with the capstan gear and the follower gear together, so that the capstan gear and the follower gear rotate in opposite directions.

This embodiment can have multiple preferred technical schemes. In one scheme, the main shaft has at least one profiled surface, through which the reversing means engages with the main shaft. Further, the main shaft has a plurality of profiled surfaces. Even further, the main shaft has three profiled surfaces. In addition, the at least one profiled surface of the main shaft may be configured into two segments, which are corresponding to the two driving elements, respectively.

In this preferred scheme, the reversing means sleeved on the main shaft includes a reversing element and two sets of rolling elements: wherein the reversing element is sleeved on the main shaft coaxially in clearance fitting, two sets of slots whose dimensions are slightly larger than those of the rolling elements are disposed on the reversing element for receiving the two sets of rolling elements respectively, positions of which are corresponding to positions of the two driving elements; each one of the two driving elements has an inner circumference, through which the driving elements are sleeved on the reserving element coaxially in clearance fitting; each set of the rolling elements includes at least one rolling element, which can roll on the profiled surface; the rolling element can be pushed with the two sets of slots of the reversing element to engage with the profiled surface and the inner circumference together; wherein the one-way clutch is formed through the rolling elements engaging with the profiled surface and the inner circumference together.

Further, the inner circumferences are cylinder surfaces, the rolling elements are cylinder rolling needles, and the axes of the rolling needles are parallel to the axis of the main shaft. Or, the inner circumferences are frusto-conical surfaces, the rolling elements are conical rolling shafts, the profiles of the rolling shafts are matched with gaps between the profiled surface and the inner circumferences. Or, the inner circumferences are cylinder surfaces or annular surfaces, the rolling elements are rolling balls.

Further, a radial gap is formed between the profiled surface and the inner circumference, wherein dimension of middle portion of the gap is larger than diameters of the rolling elements, and dimensions of both end portions of the radial gap are smaller than the diameters of the rolling elements. Even further, the profiled surface is a cylindrical surface, an elliptic cylindrical surface, a paraboloid or a plane.

Further, number of the rolling elements within one set of the two sets of the slots of the reversing element equals to number of the profiled surfaces. Even further, number of the rolling elements within each of the two sets of the slots of the reversing element equals to number of the profiled surfaces. Or, number of the rolling elements within one set of the two sets of the slots of the reversing element is larger than number of the profiled surfaces. Or, number of the rolling elements within one set of the two sets of the slots of the reversing element is smaller than number of the profiled surfaces.

Further, the reversing element can be switched between two predetermined positions around circumference of the main shalt, to set rotation direction of the main shaft through changing position relationship between the profiled surface and the rolling elements.

In another preferred technical scheme of the bidirectional mechanical converting unit of the present invention, two pawl seats are disposed on the main shaft in positions corresponding to the two driving elements; a pair of opposite swinging pawls is disposed on each of the pawl seats symmetrically; the two driving elements are provided at least partially annularly with a toothed inner circumference which can engage with at least one of the pawls; the reversing means is sleeved on the main shaft, and positioning of the pawls can be controlled, to set rotation direction of the main shaft through changing the positioning of the pawls.

Further, the reversing means includes a reversing element sleeved on the main shaft coaxially in clearance fitting; the reversing element have openings through which the pawls can engage with the toothed inner circumference; at least one end of the openings around circumference of the main shaft is used for pushing the pawls, to control the positioning of the pawls; wherein the one-way clutch is formed through the pawls engaging with the toothed inner circumference. Even further, the reversing element can be switched between two predetermined positions around circumference of the main shaft, to set rotation direction of the main shaft through changing the positioning of the pawls.

Further, an elastic element is disposed between each pair of the pawls to keep the pawls diverging against the toothed inner circumference.

Further, the toothed inner circumference is an inner ratchet circumference.

In yet another preferred technical scheme of the bidirectional mechanical convening unit of the present invention, two sets of slots are disposed at positions on a circumference of the main shaft corresponding to positions of the two driving elements, and each set of slots includes two slots; a detent urged outwards by an elastic element is disposed in each slot, the two driving elements are provided with a toothed inner circumference distributed annularly which can engage with at least one of the detents; the reversing means is sleeved on the main shaft, and positioning of the detents can be controlled, to set rotation direction of the main shaft through changing the positioning of the detents.

Further, the reversing means includes a reversing element sleeved on the main shaft coaxially in clearance fitting; the reversing element has openings through which the detents can engage with the toothed inner circumference; at least one end of the openings around circumference of the main shaft is used for pushing the detents, to control the positioning of the detents; wherein the one-way clutch is formed through the detents engaging with the toothed inner circumference. Even further, the reversing element can be switched between two predetermined positions around circumference of the main shall, to set rotation direction of the main shaft through changing the positioning of the detents.

Further, an outer end of the detent may be flat or include an inclined surface matching with the toothed inner circumference.

In each of the preferred technical schemes of the bidirectional mechanical converting unit of this embodiment, two orientation portions which correspond to the two positions of the reversing element are disposed on the reversing element, so as to set the rotation direction of the main shaft. Further, the two orientation portions on the reversing element includes two orientation slots for setting clockwise or counterclockwise rotation of the main shaft correspondingly, the main shaft includes an orientation ball supported by a spring which can be positioned in either of the two orientation slots, so as to set the main shaft to rotate in clockwise or counterclockwise direction. Or, in each of the preferred technical schemes of the bidirectional mechanical converting unit of this embodiment, further comprises: a push button assembly disposed on the main shaft, wherein the push button assembly can slide along a direction parallel to the axis of the main shaft, but can not rotate relative to the main shaft around circumference of the main shaft, a helical sliding slot disposed on the reversing element, wherein the push button assembly further slidably engages with the sliding slot, so as to convert a linear movement of the push button assembly along the direction parallel to the axis of the main shaft to a circular movement of the reversing element relative to the main shaft, so that the reversing element switches between the two positions to set the rotation direction of the main shaft. Further, may include a head cap fixedly connected to the main shaft, a slideway parallel to the axis of the main shaft is disposed on the head cap; the push button assembly is slidably disposed on the slideway.

In each of the preferred technical schemes of the bidirectional mechanical converting unit of this embodiment, the transmission structure may include a transmission seat, on which the at least one idle gear axle is disposed perpendicularly to the main shaft, the transmission seat is sleeved on the reversing element coaxially in clearance fitting; and the transmission seat is fastened to a mounting means. Even further, the mounting means is a holding ring or a supporting frame.

The bidirectional mechanical converting unit of the present invention may include various other embodiments, for example:

The two driving elements are a first spur gear and a second spur gear; the transmission structure includes: a first axle and a second axle disposed parallel to and in a predetermined space-apart relationship with the main shaft; a third spur gear and a fourth spur gear affixed on opposite ends of the first axle and the second axle respectively, so that the third spur gear intermeshes with the first spur gear and the fourth spur gear intermeshes with the second spur gear; and a fifth spur gear affixed to center of the first axle and a sixth spur gear affixed to center of the second axle, wherein the fifth spur gear intermeshes with the sixth spur gear.

Or, one of the driving elements is a first spur gear, the other of the driving elements is a first pulley; the transmission structure includes: an axle disposed parallel to and in a predetermined space-apart relationship with the main shaft; a second spur gear and a second pulley affixed on opposite ends of the axle, the second spur gear intermeshes with the first spur gear on one side of the main shaft, and the second pulley is positioned for being driven by the first pulley via a belt; a belt coupling the first pulley with the second pulley.

Or, the two driving elements are a first pulley and a second pulley; the transmission structure includes: a first axle and a second axle which are disposed parallel to and in a predetermined space-apart relationship with the main shaft; a third pulley and a fourth pulley affixed on opposite ends of the first axle and the second axle respectively, so that the third pulley is positioned for being driven by the first pulley via a first belt and the fourth pulley is positioned for being driven by the second pulley via a first belt; and a first spur gear affixed to center of the first axle and a second spur gear affixed to center of the second axle, wherein the first spur gear intermeshes with the second spur gear.

Or, the two driving elements are a first 3D pulley and a second 3D pulley, the transmission structure includes: an axle disposed in a plane perpendicular to and in a predetermined spatial relationship to the main shaft; a third 3D pulley and a fourth 3D pulley which are mounted on opposite ends of the axle; and a 3D belt coupling the first, the second, the third and the fourth pulley.

The present invention also discloses a manual tool, which includes any one of above mentioned bidirectional mechanical converting unit, wherein the rotation means is a handle, the main shaft rotates in a predetermined direction to output torque no matter in which direction the handle rotates, and the predetermined direction can be reversed. Further, a tool head is disposed on the main shaft to make the manual tool a screwdriver, a manual drill or a torque wrench. Even further, the tool head is a bit holder for mounting a variety of tool bits.

The bidirectional mechanical converting unit of the present invention combines the function of one-way clutches and the function of a reverser together on a reversing means, with a compact and simple structure. It not only can efficiently utilizes the movements of the rotation means in either way, but also can switch the rotation direction of the output shaft conveniently upon demand, with easy operations. The whole product is an integral design of which parts are not easy to get lost. When a push button is provided, the operator can push with only one finger and ease the direction-switching of the output shaft greatly.

The present invention will be described in detail hereinafter in combination with the attached drawings and embodiments for better understanding the purpose, features and effects of the present invention.

BRIEF DESCRIPTION OF THE DRAWINGS

FIG. 8C is a partial sectional view along C-C in FIG. 2 with simplified components;

FIG. 8D is a partial sectional view along D-D in FIG. 2 with simplified components;

FIG. 9C is a partial sectional view along C-C in FIG. 3 with simplified components;

FIG. 9D is a partial sectional view along D-D in FIG. 3 with simplified components;

DETAILED DESCRIPTION

Embodiment I

Figure 1:
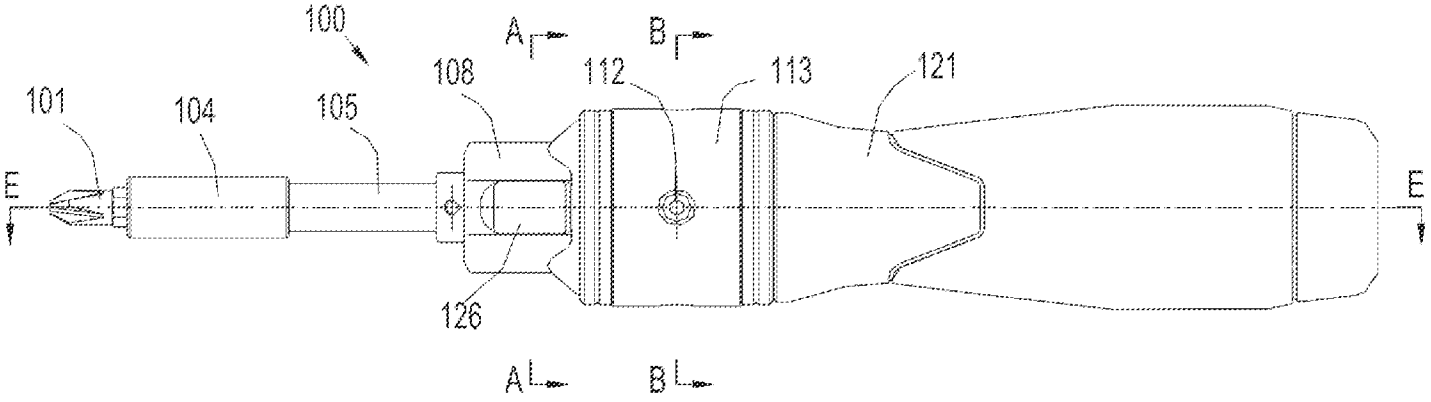
FIG. 1 is a front elevational view of a first embodiment of the present invention in a first working state.
Figure 2:
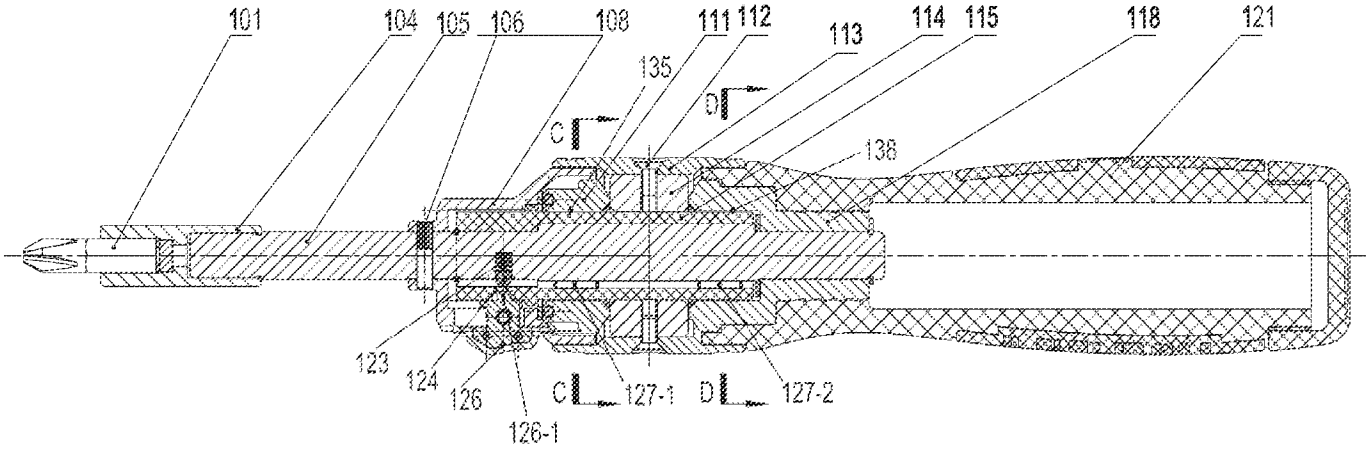
FIG. 2 is a sectional view along E-E of the embodiment in FIG. 1.
Figure 4:
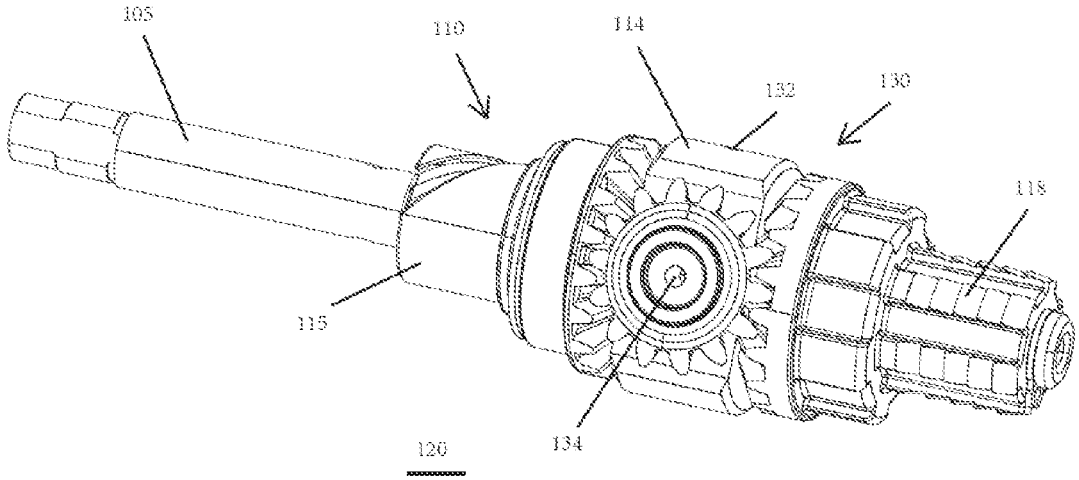
FIG. 4 shows the assembly of the driving mechanism of the first embodiment of the present invention.
Figure 5:
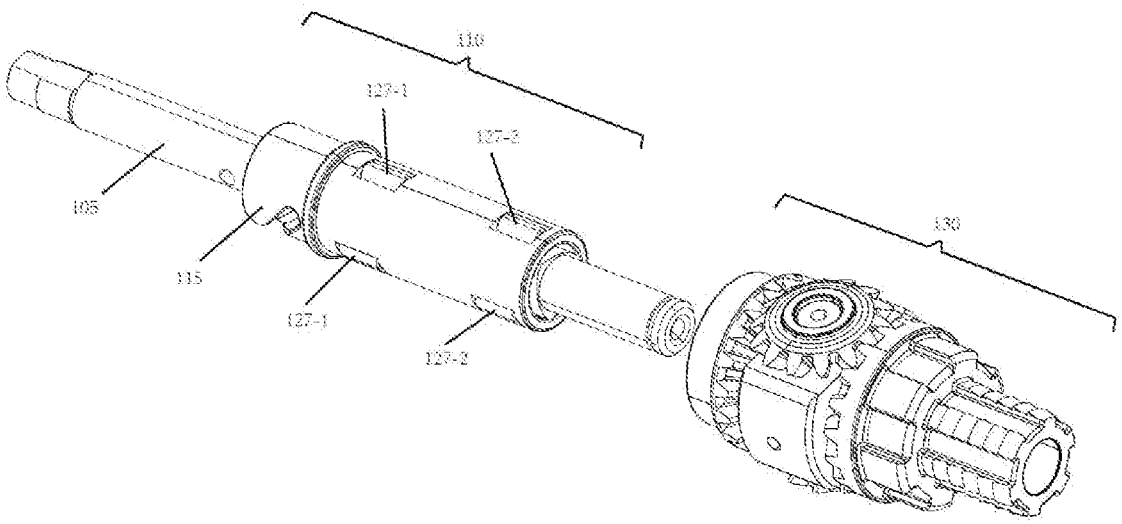
FIG. 5 is an exploded view of the driving mechanism in FIG. 4, wherein the driving means is removed from the reversing means.
Figure 6:
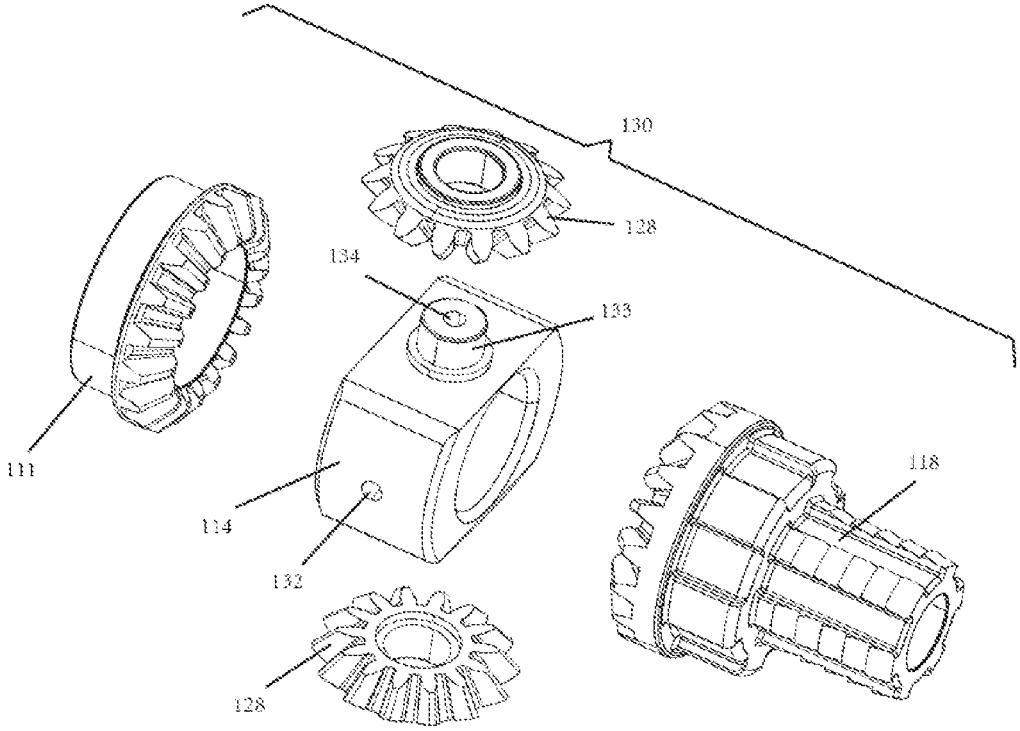
FIG. 6 is an exploded view of the driving means in FIG. 5.

Refer to FIGS. 1 and 2, a preferred embodiment is a manual screwdriver 100 utilizing the bidirectional mechanical converting unit of the present invention, which achieves bidirectional double-speeded driving through a driving mechanism 120 as shown in FIG. 4. The driving mechanism 120 includes a driving means 130 and a reversing means 110 as shown in FIG. 4, for realizing the rotation direction switching of the main shaft. FIGS. 5 and 6 illustrate the structural and assembly relationship between the driving means 130 and the reversing means 110. "Bidirectional double-speeded driving" or "bidirectional driving" in the present invention is in connection with the input, in other words, the input force of the handle, which acts as a rotation means, may be in either direction of clockwise and counterclockwise, and the input force at either direction can be utilized effectively. And the "direction switching" or "direction switchable" in the present invention is in connection with the output rotation direction of the main shaft can be selected to be one of clockwise or counterclockwise, upon demand. The clockwise or counterclockwise direction in the present invention is defined as the rotation direction observed along the axis from the bit to the handle.

The structure, operation and principle of the manual screwdriver 100 in this embodiment are described as follows.

1. Overall Structure of Screwdriver 100

Screwdriver 100 comprises a main shaft 105, a driving mechanism 120 and a rotation means. In this embodiment, the rotation means is a handle 121, with which the torque is input at either direction (either of clockwise and counterclockwise) is delivered to the main shaft 105 through the driving mechanism 120, so that the main shaft 105 outputs torque at a predetermined direction (one of clockwise and counterclockwise directions). The driving mechanism 120 is mounted on the main shaft 105, to deliver the driving torque of the handle 121 to the main shaft 105. A variety of tool bits 101 can be installed on the main shaft 105 via a bit holder 104 on the main shaft 105, for outputting torque.

Observed externally, the screwdriver 100 further includes a head cap 108 and a holding ring 113.

The head cap 108 is fixed on the main shaft 105 with a pin 106, so that the head cap 108 rotates together with the main shaft 105.

The holding ring 113 and the handle 121 are grasped with the two hands of an operator respectively, wherein the holding ring 113 keeps stationary when it is grasped, and the handle 121 can be rotated in either direction (either of clockwise and counterclockwise directions) relative to the holding ring 113. The stationary holding ring 113 is the reference for rotations of each component of the screwdriver 100.

2. Driving Mechanism 120

As shown in FIGS. 4 and 5, the driving mechanism 120 includes the driving means 130 and the reversing means 110, for realizing the bidirectional double-speeded driving while the main shaft direction can be switched. The driving means 130 is sleeved on the outside of the reversing means 110, and the reversing means 110 is sleeved on the outside of the main shaft 105. The reversing means 110 [plays with] *has* two functions: i) engaging with the driving means 130 to convert the bidirectional input into unidirectional output (i.e., the function of one-way clutches); and ii) switching the output direction (i.e., the function of a reverser).

2.1. Structure of the Driving Means 130

As shown in FIG. 6, the driving means 130 includes four bezel gears which include a capstan gear 118, a follower gear 111, and two idle gears 128 which engage with the capstan gear and the follower gear together, and a transmission seat 114. It makes the driving more balanced by using two idle gears. It is also workable to use only one idle gear, which does not affect the implementation of the present invention; therefore this invention is not limited thereto. The capstan gear 118 is fixed with the handle 121 to deliver the torque input from the handle.

The capstan gear 118, the transmission seat 114 and the follower gear 111 are sleeved on the reversing element 115 of the reversing means 110 coaxially in clearance fitting in sequence, wherein the reversing means 110 forms the one-way clutch relationships of the capstan gear 118 and the follower gear 111 with the main [shall] *shaft* 105 respectively, namely, at one direction, the capstan gear entrains the main shaft while the follower gear overruns the main shaft; at the other direction, the functions of the capstan gear and the follower gear are exchanged, the follower gear which was overrunning entrains the main shaft, while the capstan overruns the main shaft. Detailed implementation of the one-way clutch relationships will be further described in following section 2.2 and 2.3.

Figure 8A:
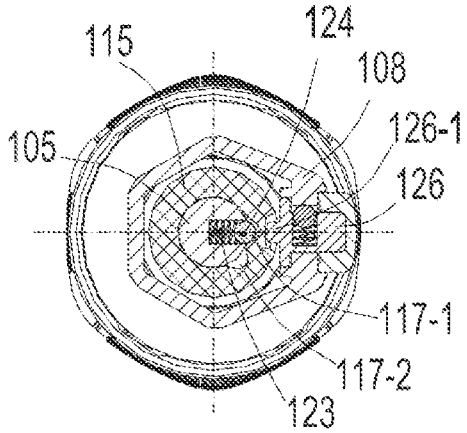
FIG. 8A is a sectional view along A-A in FIG. 1.
Figure 8B:
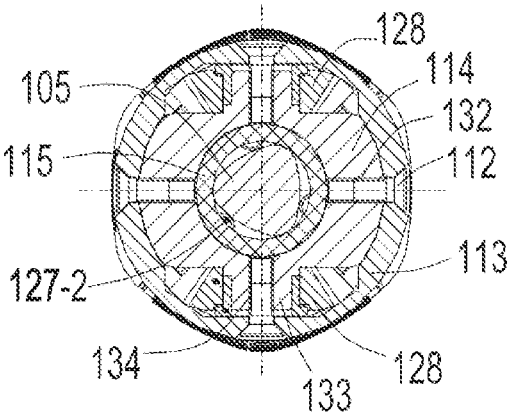
FIG. 8B is a sectional view along B-B in FIG. 1.

FIG. 8B shows the coupling relationship of the transmission seat 114, the reversing element 115 and the holding ring 113. The transmission seat 114 can rotate relative to the reversing element 115. The transmission seat 114 is provided with two idle gear axles 133 radially, for mounting the idle gears 128. The idle gears 128 force the capstan gear 118 and the follower gear 111 always rotate in opposite directions, namely, when the capstan gear rotates clockwise, the follower gear rotates counterclockwise; vice versa, the follower gear rotates clockwise while the capstan gear rotates counterclockwise.

The transmission seat 114 further includes radial threaded holes 132 for fixing the holding ring 113. The holding ring 113 is fixed on the transmission seat 114 with screws 112. In this embodiment, threaded holes 134 are also provided axially on the idle gear axles 133. To have a compact structure, the threaded holes 134 may also be used to fix the holding ring 113, while the holding ring 113 further has the function of containing the axial displacement of the idle gears 128. Of course, the holding ring 113 of the present invention can be fixed on the transmission seat 114 through the threaded holes 132 only, and at the mean time, axial stoppers are provided through the threaded holes 134, or retaining elements such as retainer rings are provided on the idle gear axles, to contain the axial displacement of the idle gears 128.

2.2. Structure and Principle of the Reversing Means 110

As shown in FIG. 5, the reversing means 110 is sleeved on the main shaft 105, and the outside of the reversing means 110 is sleeved with the driving means 130. The reversing means 110 includes a reversing element 115 and two sets of rolling needles 127-1 and 127-2. The reversing element 115 is sleeved on the main shaft 105 coaxially in clearance fitting. Two sets of slots of which dimensions are larger than the rolling needles 127-1 and 127-2 are formed on the reversing element 115, to receive the rolling needles 127-1 and 127-2, and allow the rolling needles 127-1 and 127-2 rolling freely. Axes of the rolling needles 127-1 and 127-2 are parallel to the axis of the main shaft 105. Refer to FIG. 2, the two sets of slots and rolling needles 127-1 and 127-2 are corresponding to the positions of the capstan gear 118 and the follower gear 111 of the driving means 130 respectively, namely, the first set of slots and rolling needles 127-2 engage with the inner circumference 138 of the capstan gear 118, and the second set of slots and rolling needles 127-1 engage with the inner circumference 135 of the follower gear 111. The inner circumferences of this embodiment are cylinder surfaces.

Figure 7:
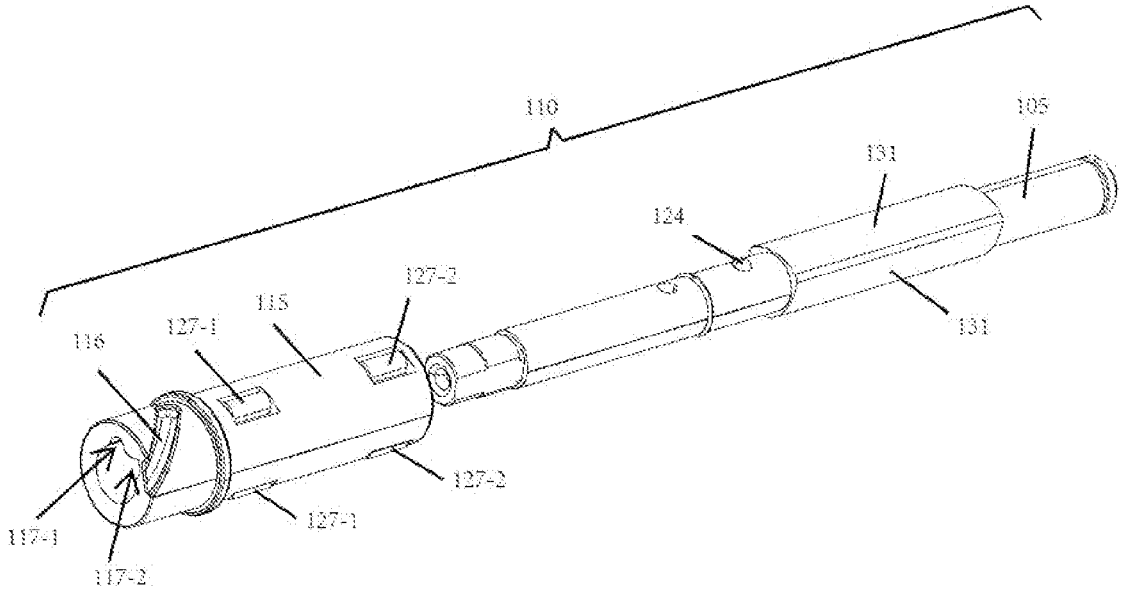
FIG. 7 is an exploded view of the reversing means in FIG. 5.
Figure 10:
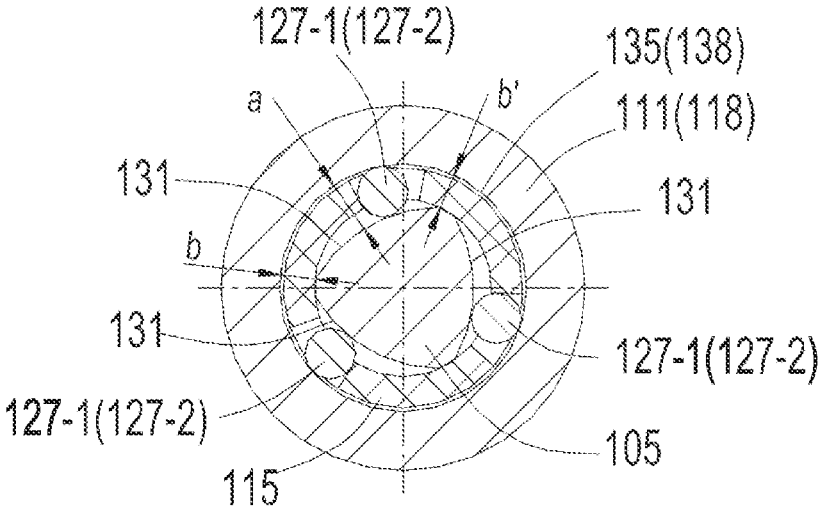
FIG. 10 is a partial sectional view shows the engagement between the main shaft and the capstan gear or the follower gear in the first embodiment of the present invention.

As shown in FIGS. 7 and 10, profiled surfaces 131 are disposed on the main shaft 105 at positions corresponding to the slots and rolling needles. In this embodiment, three profiled surfaces 131 are disposed on the main shaft 105, corresponding to three rolling needles 127-1 or 127-2 in each set, and the rolling needles 127-1 and 127-2 can roll on the profiled surfaces 131. In fact, there are two segments of working face on each profiled surface 131, which engage with the inner circumference 135 and the inner circumference 138 through the rolling needles 127-1 and 127-2 respectively. The working face of the profiled surface 131 may be a cylindrical surface, an elliptic cylindrical surface, a paraboloid or other curved surface, also may be a plane, in other words, the outer contour line of the transect of the profiled surface 131 may be an arc, an elliptic arc, a parabola or other curves, and also may be a straight line. A radial gap is formed between the profiled surface 131 and the inner circumference 135 or the inner circumference 138 (refer to the engagement relationship between the main shaft 105 and the capstan gear [138] *118* or the follower gear 111 shown in FIG. 10), to contain the movement of the rolling needles therein. As long as around circumference of the main shaft, the dimension of the middle portion a of the radial gap is larger than the diameters of the rolling needles 127-1, 127-2, and the dimensions of the end portions b, b' are smaller than the diameters of the rolling needles 127-1, 127-2, and the rolling needles can be pushed by the reversing element 115 to move between the two ends of the radial gap, and meet the self-locking condition at the engagement positions of the rolling needles with the profiled surfaces and the inner circumferences, thus the purpose of the present invention can be realized. The radial gap is not necessary to be symmetrical, namely, it does not affect the purpose of the present invention if b is not equal to b'.

In other embodiments, the number of the profiled surfaces can be one, two or more than three, which is also workable for the purpose of the present invention therefore this invention is not limited thereto. Accordingly, the number of rolling needles in each set can be one, two or more than three, and it is even workable if the number of the rolling needles is less or more than the number of the profiled surfaces. For example, total six slots in two sets are disposed on the reversing element 115 in this embodiment, for disposing rolling needles 127-1 and 127-2. Even several slots receive no rolling needles, as long as assuring at least one rolling needle exists in each set of slots, the purpose of the present invention can be realized. If two rolling needles are disposed in one slot, no matter they are arranged side-by-side or axially head-by-end, the purpose of the present invention still can be realized.

In summary, as long as the capstan gear and the follower gear of the driving means 130 are engaged with the profiled surface through the rolling needles respectively, the purpose of the present invention can be realized, and this invention is not limited thereto. The rolling needles of the present invention can alternatively be replaced with other rolling elements, such as rolling balls, conical rolling shafts, etc., and at the meantime the corresponding configuration of the profiled surfaces and the inner circumferences are matched with the shape of the rolling elements. For example, the profiled surfaces and the inner circumferences are configured as annular or frusto-conical surfaces. Of course, each of the profiled surfaces may be machined into two segments of working faces corresponding to the two sets of rolling needles 127-1 and 127-2, and the purpose of the present invention also can be realized. The inner circumference 135 and the inner circumference 138 of this embodiment are of the same diameter. If they are of different diameters, as long as suitable sized rolling needles are selected to engage with the corresponding profiled surfaces, the purpose of the present invention still can be realized.

Incorporating FIGS. 8A, 8C, 8D and FIGS. 9A, 9C and 9D, the working principle of the reversing means 110 as one-way clutches and a reverser in two working states is explained hereinafter. The reversing means 110 is simplified into a structure with one rolling needle engaging with one planar profiled surface of the main shaft 105 in the figures.

FIGS. 8C and 8D correspond to the first working state of this embodiment, wherein the rolling needles 127-1 and 127-2 are pushed towards the right side in the figures with the reversing element 115. In FIG. 8C, the rolling needle 127-1 contacts the inner circumference 135 of the follower gear 111 and the profiled surface 131 at the same time, and in FIG. 8D, the rolling needle 127-2 contacts the inner circumference 138 of the capstan gear 118 and the profiled surface 131 at the same time.

When the capstan gear 118 rotates clockwise, the inner circumference 138 entrains the rolling needle 127-2 to rotate clockwise, and the rolling needle 127-2 receives friction rightwards on the profiled surface 131, i.e., the forces on the rolling needle 127-2 applied by the inner circumference 138 and the profiled surface 131 are both rightwards, so that the rolling needle 127-2 is clamped tightly by the wedged corner formed with the inner circumference 138 and the profiled surface 131, to entrain the main shaft 105 to rotate clockwise. At this moment, the follower gear 111 rotates counterclockwise, the rolling needle 127-1 engaging with the inner circumference 135 rotates counterclockwise as well, and this rolling needle receives friction leftwards on the profiled surface 131, i.e., the forces on the rolling needle 127-1 applied by the inner circumference 135 and the profiled surface 131 are both leftward. Because the dimension of the radial gap at the left side of the rolling needle is larger than the diameter of the rolling needle, the rolling needle 127-1 is in a loosed state, and correspondingly, the follower gear 111 overruns the main shaft 105.

When the capstan gear 118 rotates counterclockwise, the inner circumference 138 entrains the corresponding rolling needle 127-2 to rotate counterclockwise, the rolling needle 127-2 receives friction leftwards on the profiled surface 131. i.e., the forces on the rolling needle 127-2 applied by the inner circumference 138 and the profiled surface 131 are both leftward. Because the dimension of the radial gap at the left side of the rolling needle 127-2 is larger than the diameter of the rolling needle, the rolling needle 127-2 is in a loosed state. Therefore, the capstan gear 118 overruns the main shaft 105. However, because of the existing of the idle gears 128, the follower gear 111 rotates clockwise. The inner circumference 135 entrains the corresponding rolling needle 127-1 to rotate clockwise, and the rolling needle 127-1 receives friction rightwards on the profiled surface 131, i.e., the forces on the rolling needle 127-1 applied by the inner circumference 135 and the profiled surface 131 are both rightwards, so that the rolling needle 127-1 is clamped tightly by the wedged corner formed with the inner circumference 135 and the profiled surface 131, to entrain the main shaft 105 to rotate clockwise.

Thus it can be seen, no matter the handle drives the capstan gear to rotate clockwise or counterclockwise, the main shaft 105 rotates clockwise in the first working state.

FIGS. 9C and 9D correspond to the second working state of this embodiment, wherein the rolling needles 127-1 and 127-2 are pushed towards the left side in the figures with the reversing element 115. In FIG. 9C, the rolling needle 127-1 contacts the inner circumference 135 of the follower gear 11 and the profiled surface 131 at the same time, and in FIG. 9D, the rolling needle 127-2 contacts the inner circumference 138 of the capstan gear 118 and the profiled surface 131 at the same time.

When the capstan gear 118 rotates clockwise, the inner circumference 138 entrains the rolling needle 127-2 to rotate clockwise, the rolling needle 127-2 receives friction rightwards on the profiled surface 131, i.e., the forces on the rolling needle 127-2 applied by the inner circumference 138 and the profiled surface 131 are both rightward. Because the dimension of the radial gap at the right side of the rolling needle 127-2 is larger than the diameter of the rolling needle, the rolling needle 127-2 is in a loosed state. Therefore, the capstan gear 118 overruns the main shaft 105. However, because of the existing of the idle gears 128, the follower gear 111 rotates counterclockwise. The inner circumference 135 entrains the corresponding rolling needle 127-1 to rotate counterclockwise, and the rolling needle 127-1 receives friction leftwards on the profiled surface 131, i.e., the forces on the rolling needle 127-1 applied by the inner circumference 135 and the profiled surface 131 are both leftward, so that the rolling needle 127-1 is clamped tightly by the wedged corner formed with the inner circumference 135 and the profiled surface 131, to entrain the main shaft 105 to rotate counterclockwise.

When the capstan gear 118 rotates counterclockwise, the inner circumference 138 entrains the rolling needle 127-2 to rotate counterclockwise, and the rolling needle 127-2 receives friction leftwards on the profiled surface 131, i.e., the forces on the rolling needle 127-2 applied by the inner circumference 138 and the profiled surface 131 are both leftward, so that the rolling needle 127-2 is clamped tightly by the wedged corner framed with the inner circumference 138 and the profiled surface 131, to entrain the main shaft 105 to rotate counterclockwise. At this moment, the follower gear 111 rotates clockwise, the rolling needle 127-1 engaging with the inner circumference 135 rotates clockwise as well, and this rolling needle receives friction rightwards on the profiled surface 131, i.e., the forces on the rolling needle 127-1 applied by the inner circumference 135 and the profiled surface 131 are both rightward. Because the dimension of the radial gap at the right side of the rolling needle is larger than the diameter of the rolling needle, the rolling needle 127-1 is in a loosed state, and correspondingly, the follower gear 111 overruns the main shaft 105.

Thus it can be seen, no matter the handle drives the capstan gear to rotate clockwise or counterclockwise, the main shaft 105 rotates counterclockwise in the second working state.

In sum, the reversing means realizes the function of one-way clutches in two working states respectively.

Figure 9A:
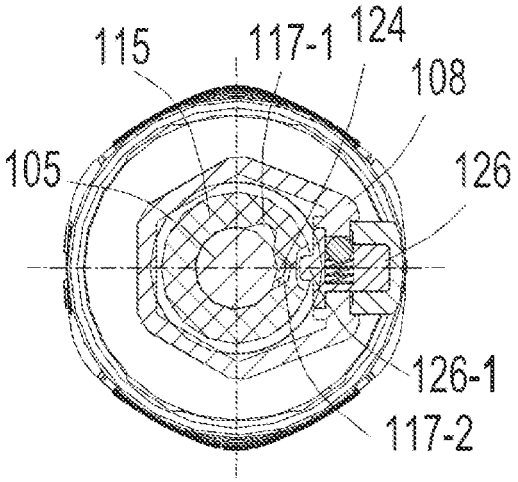
FIG. 9A is a sectional view along A'-A' in FIG. 3.

Refer to FIG. 7, FIG. 8A and FIG. 9A, two orientation slots 117-1 and 117-2 are disposed on the reversing element 115, to engage with an orientation steel ball 124 disposed on the main shaft 105 for switching between the above mentioned two working states. The orientation steel ball 124 is urged by a spring 123 within the main shaft 105 into one of the orientation slots, for setting the reversing means 110 at one of the two working states. By rotating the reversing element 115 relative to the main shaft [115] *105* by an angle, the positions of the orientation steel ball 124 in the two orientation slots can be switched, so that this embodiment can be switched between the above mentioned first working state and the second working state, and the function of a reverser of the reversing means 110 can be realized.

2.3. Operation Mode of this Embodiment is Explained as Follows Incorporating the Figures 2.3.1. Firstly, the reversing element 115 is rotated relative to the main shaft 105, to position the orientation steel bell 124 in the desired one of the two orientation slots, such as in the orientation slot 117-1 shown in FIG. 8A, then the main shaft 105 is set to be able to rotate clockwise only, and this embodiment is in the above mentioned first working state.

2.3.1.1. The operator grasps the holding ring 113 with one hand, and rotates the handle 121 clockwise with another hand, to drive the capstan gear 118 to rotate clockwise. At this moment, the rolling needle 127-2 corresponding to the capstan 118 is clamped tightly by the inner circumference 138 of the capstan gear 118 and the profiled surface 131 of the main shaft 105, to entrain the main shaft 105 to rotate clockwise. The idle gears 128 force the follower gear 111 to rotate counterclockwise, and the rolling needles 127-1 corresponding to the follower gear 111 is in a loosed state and can roll freely so that the follower gear 111 overruns the main shaft 105. Therefore the follower gear is not working now.

2.3.1.2. The operator rotates the handle 121 counterclockwise to drive the capstan gear 118 to rotate counterclockwise. At this moment, the rolling needle 127-2 corresponding to the capstan 118 is in a loosed state, and can roll freely so that the capstan gear 118 overruns the main shaft 105. The idle gears 128 force the follower gear 111 to rotate clockwise, and the rolling needles 127-1 corresponding to the follower gear 111 is clamped tightly, to entrain the main shaft 105 to rotate clockwise.

In sum, no matter in which direction the handle drives the capstan gear to rotate, it is realized to rotate the main shaft 105 clockwise.

2.3.2. Then, the reversing element 115 is rotated relative to the main shaft 105, to re-position the orientation steel ball 124 in the orientation slot 117-2, then the main shaft 105 is set to be able to rotate counterclockwise only, and this embodiment is in the above mentioned second working state. When the operator grasps the holding ring 113 with one hand, and rotates the handle 121 with another hand either clockwise or counterclockwise, the main shaft 105 rotates counterclockwise.

3. Further Improvements of the Structure of the Reversing Means 110

Figure 3:
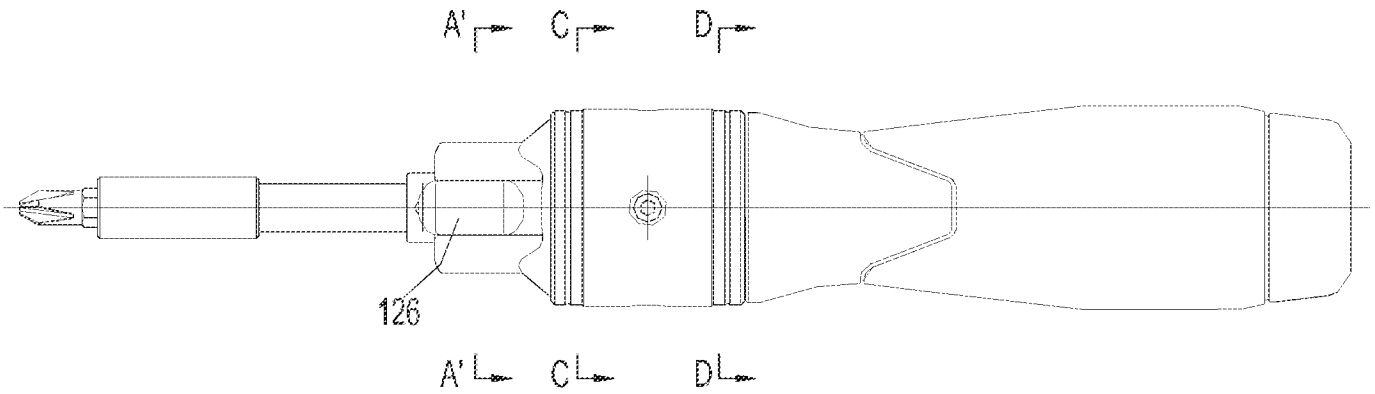
FIG. 3 is a front elevational view of the first embodiment of the present invention in a second working state.

Refer to FIGS. 1, 2 and 3, a slideway parallel to the axis of the main shaft 10S is disposed on head cap 108, and a push button assembly 126 which can slide in the slideway is disposed therein, to control the position of the reversing element 115, so as to set the rotation direction of the main shaft 105. For example, when the push button assembly 126 is toggled to the front side position (i.e., towards the tool bit as shown in FIG. 1), the orientation slot 117-1 of the reversing element 115 is engaged with the orientation steel ball 124, the main shaft 105 is able to rotate clockwise only, and the screwdriver 100 is used to tighten a screw; when the push button assembly 126 is toggled to the rear side position (i.e., leaving from the tool bit as shown in FIG. 3), the orientation slot 117-2 of the reversing element 115 is engaged with the orientation steel ball 124, the main shaft 105 is able to rotate counterclockwise only, and the screwdriver 100 is used to loosen a screw. Of course, the relationship between the push button and the rotation direction of the main shaft can be revered, and this invention is not limited thereto.

The control of the reversing element 115 with the push button assembly 126 is realized through a spatial cam mechanism. As shown in FIGS. 7, 8A and 9A, a helical sliding slot 116 is disposed on the external circumference of the reversing element 115. The push button assembly 126 has a portion protruding into the sliding slot 116, such as an arm 126-1 or a steel ball, so as to form the cam mechanism to convert the axial linear movement of the push button assembly 126 to the circular movement of the reversing element 115, i.e., by toggling the push button assembly 126 axially, and the arm 126-1 protruding into the sliding slot 116 causes the reversing element 115 to move circularly. Through the cam mechanism, the switching of the push button assembly 126 between the front and rear positions is convened to the switching of the orientation steel ball 124 between the two orientation slots.

If there is no push button assembly 126, the operator must grasp the main shaft and the reversing element 115 with two hands respectively (or parts fixed to these two parts and which are easy to be grasped) and rotate them oppositely, to realize the direction-switching. With the push button assembly 126 disposed, the operator can push it with only one finger to realize the direction-switching. This improvement eases the implementation of the reversing means 110 greatly.

Furthermore, after using the method of controlling the rotation of the reversing element 115 with the push button assembly 126, the structure of the orientation steel ball 124 and two orientation slot can be cancelled. As long as the reversing element 115 can be pushed with the push button assembly 126, and in turn pushes the rolling needles to the working positions of the one-way clutches, the purpose of the present invention can be realized.

This embodiment further includes structures for containing unnecessary axial movements of each pan, such as shoulders, retaining rings or fasteners, etc., and various bearings and oiled bushings, etc., for rotating smoothly, which are not detailed described herein, and this invention is not limited thereto.

In normal operation, the holding ring 113 of this embodiment is held stationary, i.e., the efficiency is doubled compared to the common screwdrivers without the bidirectional double-speeded driving. In actual operations, the holding ring 113 can be rotated in opposite direction relative to the handle 121, and then the rotation speed of the main shaft 105 is double of that of the handle 121, i.e., the efficiency is four times of that of the common screwdrivers without the bidirectional double-speeded driving.

Embodiment II

Figure 11C:
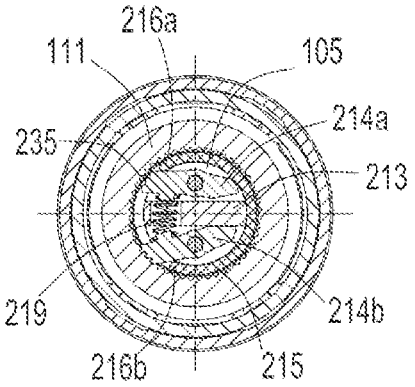
FIG. 11C is a sectional view of the reversing means corresponding to the follower gear in a second embodiment of the present invention in a first working state, and the sectioning position refers to C-C in FIG. 2 or 3 as a reference.
Figure 11D:
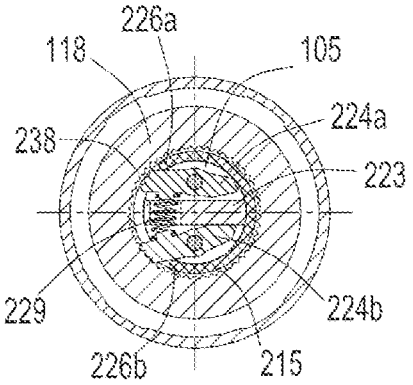
FIG. 11D is a sectional view of the reversing means corresponding to the capstan gear in the second embodiment of the present invention in the first working state, the sectioning position refers to D-D in FIG. 2 or 3 as a reference.
Figure 12C:
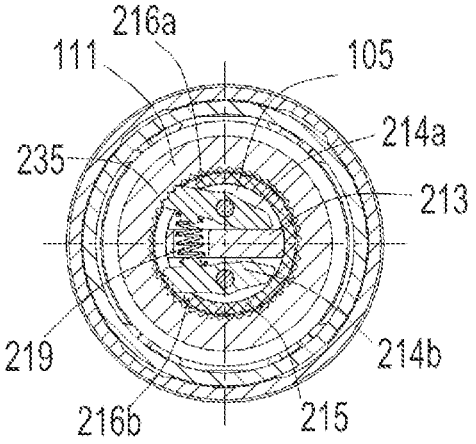
FIG. 12C is a sectional view of the reversing means corresponding to the follower gear in the second embodiment of the present invention in a second working state, the sectioning position refer to C-C in FIG. 2 or 3 as a reference.

This embodiment is similar to Embodiment I, but replaces the reversing means 110 in Embodiment I with the ratchet-pawl reversing means as shown in FIGS. 11C, 11D, 12C and 12D. Pawl seats are disposed on the main shaft 105, and two opposite swinging pawls are disposed on each of the pawl seat symmetrically, i.e., the pawl seat 223 and pawls 224a and 224b correspond to the capstan gear 118 in FIGS. 11D and 12D, and the pawl seat 213 and pawls 214a and 214b correspond to the follower gear 111 in FIGS. 11C and 12C. There are openings on the reversing element 215, two ends of each opening can push the pawls, to change the positioning of the pawls (i.e., to set the rotation direction of the main shaft). In FIGS. 11C and 12C, the two ends of the opening of the reversing element 215 are 216a and 216b, and in FIGS. 11D and 12D, the two ends of the opening are 226a and 226b. The inner circumferences of the capstan gear 118 and the follower gear 111 are modified to inner ratchet circumferences 238 and 235 disposed annularly, and these two inner ratchet circumferences can be engaged with at least one pawl respectively. Elastic elements 219 and 229 are disposed between each pair of the pawls to keep the pawls diverging against the inner ratchet circumference, to assure the reliable engagement between the pawl and the inner ratchet circumference. The working principle of this embodiment is as follows.

FIGS. 11C and 11D correspond to the first working state of this embodiment, while the pawl 224b is engaged with the inner ratchet circumference 238, and the pawl 214b is engaged with the inner ratchet circumference 235. At this moment, the opening's end 216a of the reversing element 215 pushes the pawl 214a, and the opening's end 226a of the reversing element 215 pushes the pawl 224a, to disengage with their respective inner ratchet circumference 235 and 238, so that these pawls are inactive.

If the handle 121 is rotated clockwise now, to drive the capstan gear 118 to rotate clockwise, the pawl 224b will slide over the inner ratchet circumference 238, and won't delivery torque to the main shaft 105. And the follower gear 111 will be rotating counterclockwise driven by the idle gears 128, the inner ratchet circumference 235 will deliver torque to the main shaft 105 through the pawl 214b engaged therewith, and cause the main shaft to rotate counterclockwise.

If the handle 121 is rotated counterclockwise, to drive the capstan gear 11t to rotate counterclockwise, the inner ratchet circumference 238 will deliver torque to the main shaft 105 through the pawl 224b engaged therewith, and cause the main shaft 105 to rotate counterclockwise. And the follower gear 111 will be rotating clockwise, the pawl 214b will slide over the inner ratchet circumference 235, i.e., the follower gear 111 will overrun the main shaft 105.

Thus it can be seen, no matter the handle drives the capstan gear to rotate clockwise or counterclockwise, the main shaft 105 rotates counterclockwise in the first working state.

Figure 12D:
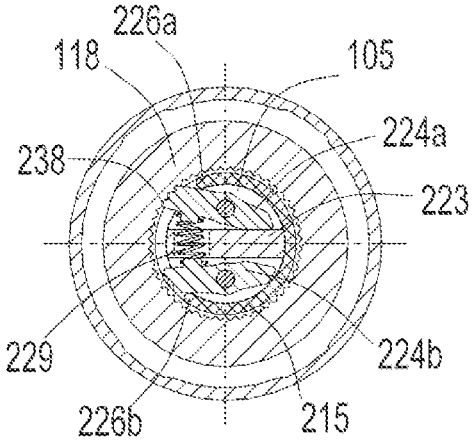
FIG. 12D is a sectional view of the reversing means corresponding to the capstan gear in the second embodiment of the present invention in the second working state, the sectioning position refers to D-D in FIG. 2 or 3 as a reference.

FIGS. 12C and 12D correspond to the second working state of this embodiment, while the reversing element 215 rotated by an angle clockwise, to have the pawl 224a engaged with the inner ratchet circumference 238, and the pawl 214a engaged with the inner ratchet circumference 235. At this moment, the opening's end 216b of the reversing element 215 pushes the pawl 214b, and the opening's end 226b of the reversing element 215 pushes the pawl 224b, to disengage with their respective inner ratchet circumference 235 and 238, so that these pawls are inactive. Based on the same principle, no matter the handle drives the capstan gear to rotate clockwise or counterclockwise, the main shaft 105 rotates clockwise in the second working state.

Therefore, by toggling the reversing element 215 relative to the main shaft 105, to have the right pawls engaged with the inner ratchet circumferences using the ends of the openings, it can be realized to switch between the above mentioned first working state and the second working state.

Embodiment III

Figure 13C:
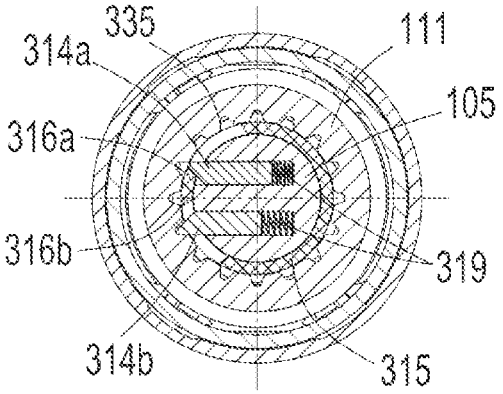
FIG. 13C is a sectional view of the reversing means corresponding to the follower gear in a third embodiment of the present invention in a first working state, the sectioning position refers to C-C in FIG. 2 or 3 as a reference.
Figure 13D:
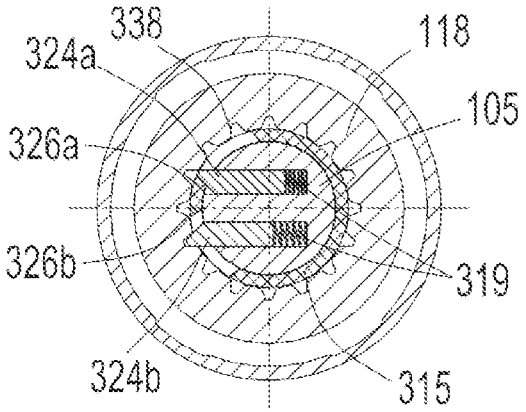
FIG. 13D is a sectional view of the reversing means corresponding to the capstan gear in the third embodiment of the present invention in the first working state, the sectioning position refers to D-D in FIG. 2 or 3 as a reference.
Figure 14C:
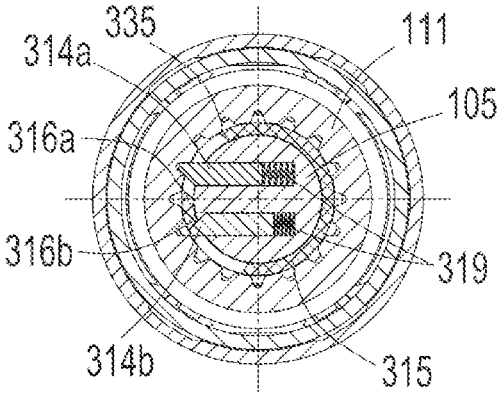
FIG. 14C is a sectional view of the reversing means corresponding to the follower gear in the third embodiment of the present invention in a second working state, the sectioning position refers to C-C in FIG. 2 or 3 as a reference.
Figure 14D:
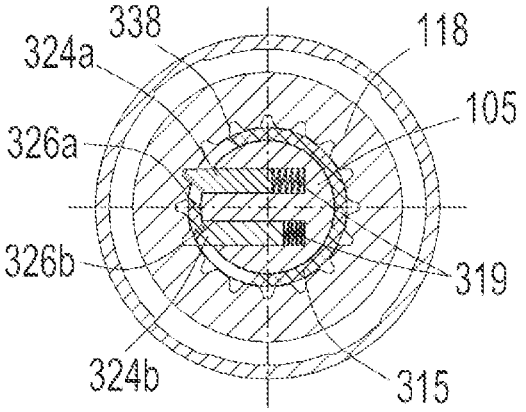
FIG. 14D is a sectional view of the reversing means corresponding to the capstan gear in the third embodiment of the present invention in the second working state, the sectioning position refers to D-D in FIG. 2 or 3 as a reference.

This embodiment is similar to Embodiment I, but replaces the reversing means 110 in Embodiment I with the reversing means with detents as shown in FIGS. 13C, 13D. 14A and 14D. Two grooves are disposed on the main shaft 105 bilaterally parallel to the axis thereof, and two detents are disposed in the grooves respectively, i.e., the detents 324a and 324b correspond to the capstan gear 118 as shown in FIGS. 13D and 14D, and the detents 314a and 314b correspond to the follower gear 111 as shown in FIGS. 13C and 14C. The outer ends of the detents 314a and 314b are inclined surfaces, and these two inclined surfaces face each other as a "V" shape. There are openings on the reversing element 315, ends of the openings can be used to push the outer ends of the detents, to depress the detents into the grooves, so as to change the working positions of the detents (i.e., to set the rotation direction of the main shaft). In FIGS. 13C and 14C, the acting ends of openings of the reversing element 315 are 316a and 316b, and in FIGS. 13D and 14D, the acting ends of openings of the reversing element 315 are 326a and 326b. The acting ends of openings of the reversing element 315 are located between the two inclined surfaces facing each other as a "V" shape. The inner circumferences of the capstan gear 118 and the follower gear 111 are modified to toothed inner circumferences 338 and 335 formed with multiple teeth, for engaging with at least one detent respectively. Each detent is urged by a springs 319 disposed within the groove for the detent on the main shaft 105, which assures a reliable engagement between the detent and the toothed inner circumference. The working principle of this embodiment is as follows.

FIGS. 13C and 13D correspond to the first working state of this embodiment, while the detent 324a is depressed into the groove through the pushing by the opening's acting end 326a of the reversing element 315, and the detent 324b is engaged with the toothed inner circumference 338; the detent 314a is depressed into the groove through the pushing by the opening's acting end 316a of the reversing element 315, and the detent 314b is engaged with the toothed inner circumference 335.

If the handle 121 is rotated clockwise now, to drive the capstan gear 118 to rotate clockwise, the toothed inner circumference 338 will deliver torque to the main shaft 105 through the detent 324b engaged therewith, and cause the main shaft 105 to rotate clockwise. And the follower gear 111 will be rotating counterclockwise driven by the idle gears 128, the detent 314b will slide over the toothed inner circumference 335, and won't delivery torque to the main shaft 105, i.e., the follower gear 111 will overrun the main shaft 105.

If the handle 121 is rotated counterclockwise, to drive the capstan gear 118 to rotate counterclockwise, the detent 324b will slide over the toothed inner circumference 338, and won't delivery torque to the main shaft 105. And the follower gear 111 will be rotating clockwise driven by the idle gears 128, and the toothed inner circumference 335 will deliver torque to the main shaft 105 through the detent 314b engaged therewith, and cause the main shaft 105 to rotate clockwise.

Thus it can be seen, no matter the handle drives the capstan gear to rotate clockwise or counterclockwise, the main shaft 105 rotates clockwise in the first working state.

FIGS. 14C and 14D correspond to the second working state of this embodiment, while the detent 324b is depressed into the groove through the pushing by the opening's acting end 326b of the reversing element 315, and the detent 324a is engaged with the toothed inner circumference 338; the detent 314b is depressed into the groove through the pushing by the opening's acting end 316b of the reversing element 315, and the detent 314a is engaged with the toothed inner circumference 335. Based on the same principle, no matter the handle drives the capstan gear to rotate clockwise or counterclockwise, the main shaft 105 rotates counterclockwise in the second working state.

Therefore, by toggling the reversing element 315 relative to the main shaft 105, to have the right detents engaged with the toothed inner circumferences with the acting ends of the openings, it can be realized to switch between the above mentioned first working state and the second working state.

Embodiment IV

Figure 15:
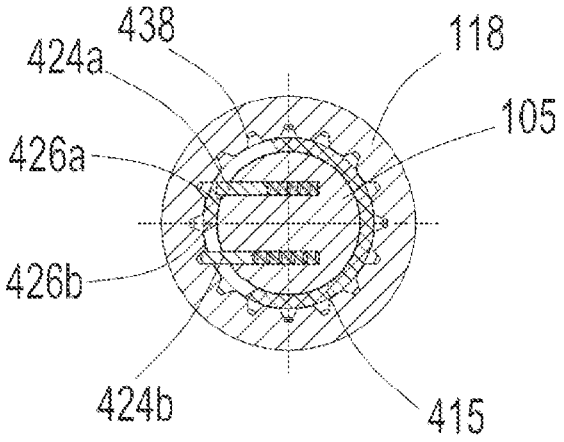
FIG. 15 is a partial sectional view shows the structural relationship of the main shaft, the detents, the reversing element and the capstan gear, in a fourth embodiment of the present invention.

This embodiment is a variation of Embodiment III on the detents, i.e., modifying the outer ends of the detents to flat surfaces. Take the components corresponding to the capstan gear 118 as shown in FIG. 15 as an example, the outer ends of the detents 424a and 424b are flat, and the opening's acting ends 426a and 426b of the reversing element 415 are located between the two detents, for pushing the outer ends of the detents and depressing the detents into the grooves, so as to change the working positions of the detents (i.e., to set the rotation direction of the main shaft). The toothed inner circumference 438 of the capstan gear 118 can be engaged with at least one detent. It is appreciated that the working principle of this embodiment is similar to the Embodiment III, and the purpose of the present invention can be realized as well.

Embodiment V

Figure 16:
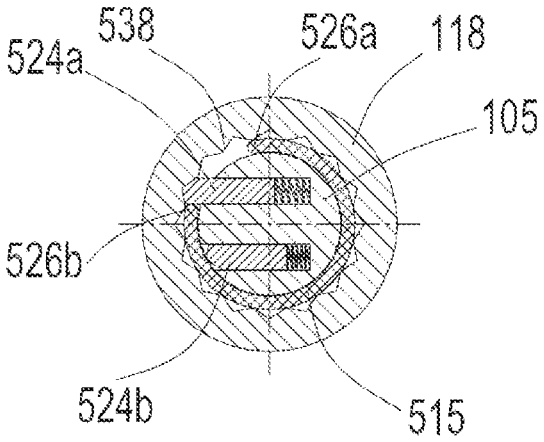
FIG. 16 is a partial sectional view shows the structural relationship of the main shaft, the detents, the reversing element and the capstan gear, in a fifth embodiment of the present invention.
Figure 17:
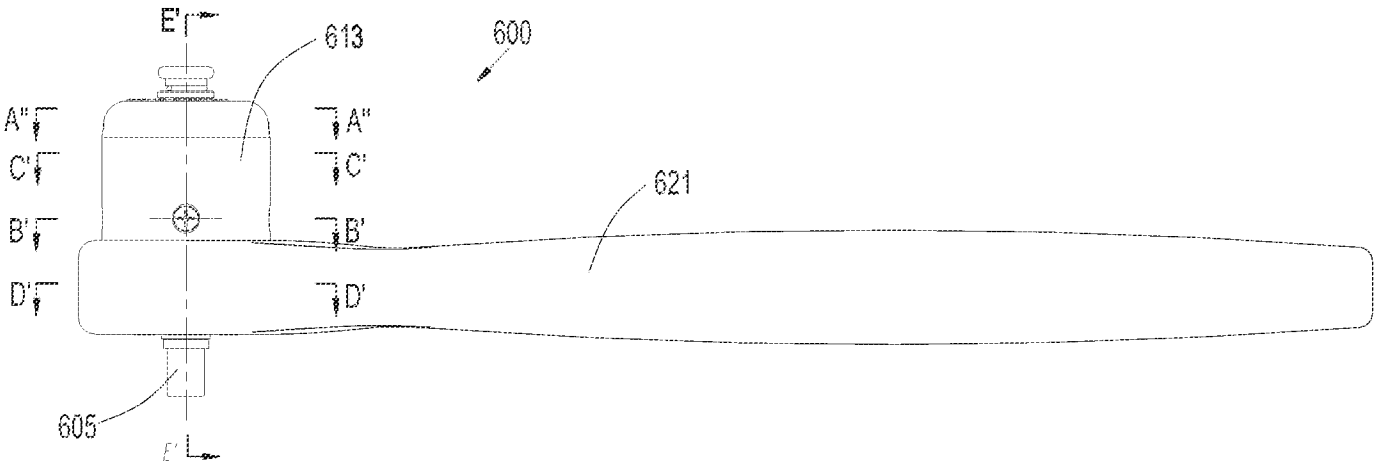
FIG. 17 is a front elevational view of a sixth embodiment of the present invention.
Figure 17A:
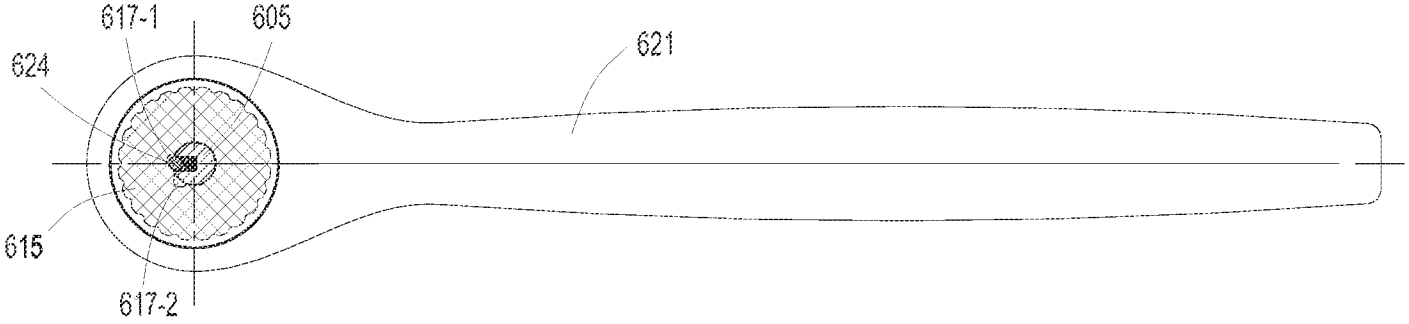
FIG. 17A is a sectional view along A"-A" of the embodiment in FIG. 17.
Figure 17B:
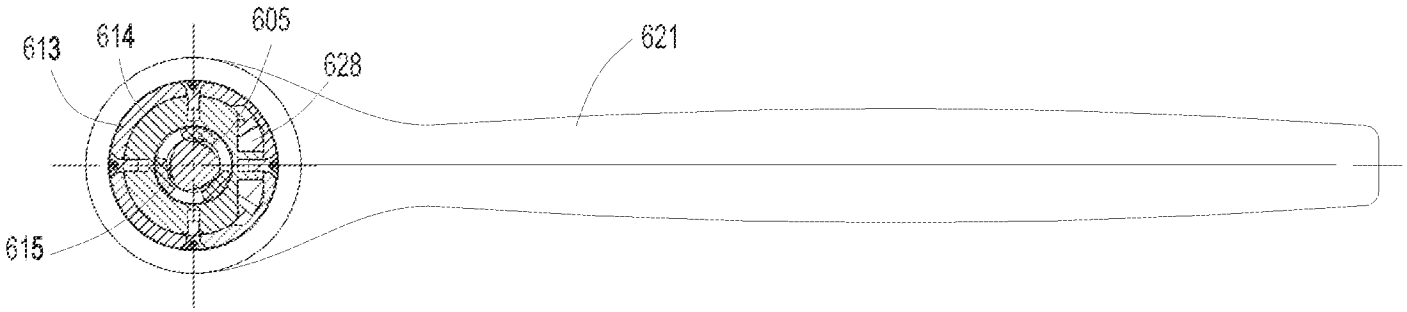
FIG. 17B is a sectional view along B'-B' of the embodiment in FIG. 17.
Figure 17C:
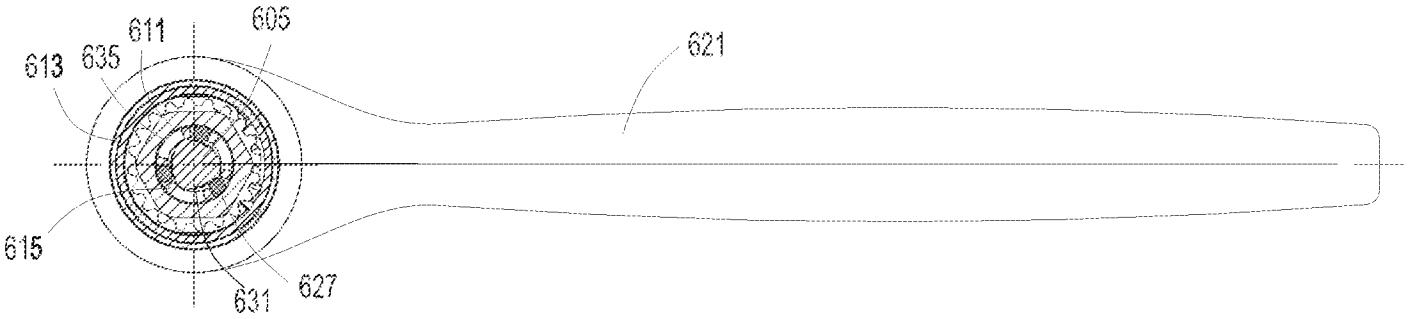
FIG. 17C is a sectional view along C'-C' of the embodiment in FIG. 17.
Figure 17D:
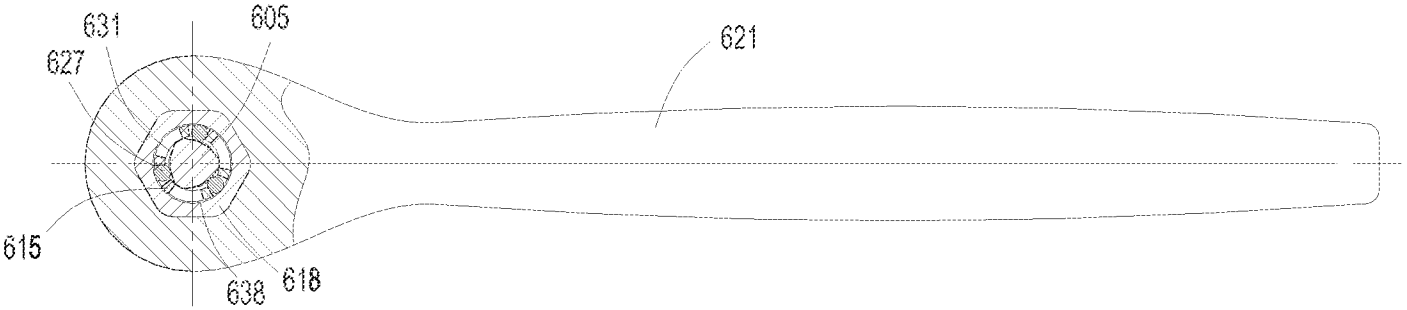
FIG. 17D is a sectional view along D'-D' of the embodiment in FIG. 17.
Figure 17E:
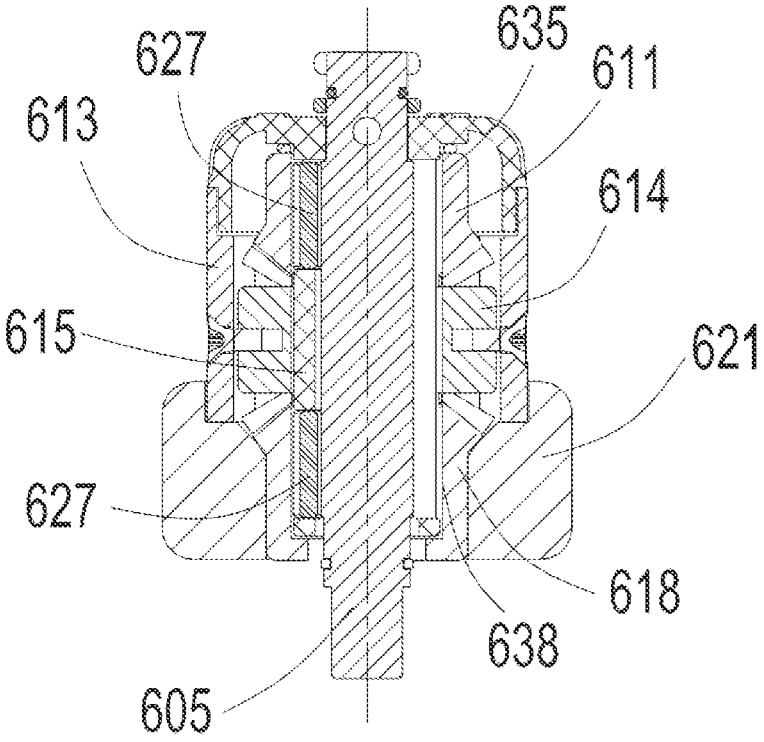
FIG. 17E is a sectional view along E'-E' of the embodiment in FIG. 17.

This embodiment is another variation of Embodiment III on the detents and the reversing element. Take the components corresponding to the capstan gear 118 as shown in FIG. 16 as an example, the outer ends of the detents 524a and 524b are toothed shaped matching with the toothed inner circumference 538 of the capstan gear 118, and the opening's acting ends 526a and 526b of the reversing element 415 are located at outer flank of the detents, for pushing the outer ends of the detents and depressing the detents into the grooves, so as to change the working positions of the detents (i.e., to set the rotation direction of the main shaft). The toothed inner circumference 538 of the capstan gear 118 can be engaged with at least one detent. It is appreciated that the working principle of this embodiment is similar to the Embodiment III, and the purpose of the present invention can be realized as well.

Embodiment VI

This embodiment is a torque wrench 600 utilizing the bidirectional mechanical converting unit of the present invention, which achieves bidirectional double-speeded driving through a driving mechanism similar to the Embodiment I. The driving mechanism also includes a driving means and a reversing means, for realizing the rotation direction switching of the main shaft, as shown in the structure of FIGS. 17, and 17A-17E.

The torque wrench 600 comprises a main shaft 605, a driving mechanism and a rotation means. In this embodiment, the rotation means is a handle 621, with which the torque input at either direction (either of clockwise and counterclockwise directions) is delivered to the main shaft 605 through the driving mechanism, so that the main shaft 605 outputs torque at a predetermined direction (one of clockwise and counterclockwise directions). The driving means of this embodiment includes a capstan gear 618, a follower gear 611, an idle gear 628 which engages with the capstan gear and the follower gear together, and a transmission seat 614. The capstan gear 618, the follower gear 611 and the transmission seat 614 are sleeved on the outside of the reversing means. The capstan gear 618 is fixedly coupled with the handle 621. The transmission seat 614 is used to mount the idle gear 628, and to fix the holding ring 613.

Profiled surfaces 631 are disposed on the main shaft 605. The reversing means includes a reversing element 615 with two sets of slots and rolling needles 627 disposed within the slots, which are corresponding to the capstan gear 618 and the follower gear 611 to realize the function of one-way clutches. Particularly, around the capstan gear 618, the rolling needles 627 pushed by the reversing element 615 are engaged with the profiled surfaces 631 of the main shaft and the inner circumference 638; around the follower gear 611, the rolling needles 627 pushed by the reversing element 615 are engaged with the profiled surfaces 631 of the main shaft and the inner circumference 635. Two orientation slots 617-1 and 617-2 are provided at one end of the reversing element 615, to engage with an orientation steel ball 624 on the main shaft 605, to realize the function of a reverser. The working principle of this embodiment is similar to that of the Embodiment I: the operator grasps the handle 621 and the holding ring 613 with two hands respectively, wherein the holding ring 613 keeps stationary. No matter the handle 621 rotates clockwise or counterclockwise, the main shaft 605 will rotate in a direction set according to the orientation slot of the reversing element 615.

In other embodiments, the reversing means in the torque wrench 600 may be replaced with the ratchet-pawl reversing means or the reversing means with detents in the Embodiments II-V, and the purpose of the present invention can be realized as well.

The abovementioned manual tool could be a manual drill or other similar tool, in addition to the screwdriver and torque wrench, as long as the rotation means (a handle) with which the torque is input is coaxial with the main shaft, it can utilize the bidirectional mechanical converting unit of the present invention to realize that the main shaft will output torque in a predetermined direction, no matter how the rotation means rotates, and the predetermined direction of the main shaft can be switched.

The bidirectional mechanical converting unit of the present invention can be implemented in other systems or apparatus. In other embodiments which also include a main shaft, a driving mechanism and a rotation means, the bezel gear drive is replaced with other transmission solution such as spur gear drive, spur gear plus shaft drive, pulley drive plus shaft drive or 3D pulley drive, etc., to force the capstan gear and the follower gear to always rotate in opposite directions. As long as the reversing means with the functions of one-way clutches and a reverser together of the present invention is adopted in the driving mechanism, the other embodiments can also realize the purpose of the present invention. i.e., the input force of the rotation means can be either clockwise or counterclockwise, the input force in either direction can be effectively utilized to be delivered to the main shaft and be output in a predetermined direction, and the rotation direction of the main shaft can be switched conveniently. In the embodiments of the other systems or apparatus, the holding ring of the reversing means of the driving mechanism also can be replaced to a mounting means, such as a supporting frame, acting as the mounting base of the whole system or apparatus.

What stated above are merely preferred embodiments of the present invention but are not used to limit the present invention. Any modification, equivalent replacement and improvement made to the present invention without going beyond the spirit and principle of the present invention shall be within the scope of the appended claims.

The invention claimed is:

[1. A bidirectional mechanical converting unit comprising:

a main shaft;

a driving mechanism, which includes a driving assembly and a reversing assembly which are coupled to each other; and a rotation assembly for inputting torque, an rotation axis of the rotation assembly being coaxial with the main shaft, the rotation assembly and the driving mechanism being coupled to each other, and the driving mechanism delivering the torque to output at the main shaft in a predetermined direction;

the predetermined direction can be switched via the reversing assembly;

wherein the driving assembly is sleeved on the reversing means;

the driving assembly includes two driving elements mounted on the main shaft, each having a one-way clutch interposed between it and the main shaft, and a transmission structure coupling the two driving elements and forcing them to rotate in opposite directions; wherein the two driving elements are spaced apart axially;

the reversing assembly includes the one-way clutches;

both of the one-way clutches are functionally oriented in a same direction, so that the main shaft is entrained with one of the two driving elements which is rotating in the direction, and the main shaft is overrun by the other driving element which is rotating in the opposite direction.]

[2. A bidirectional mechanical converting unit according to claim 1, wherein the two driving elements are a capstan gear and a follower gear respectively;

the transmission structure includes at least one idle gear axle perpendicular to the main shaft, at least one idle gear is disposed on the idle gear axle and engaged with the capstan gear and the follower gear together, so that the capstan gear and the follower gear rotate in opposite directions;

and the capstan gear is fixedly coupled with the rotation assembly.]

[3. A bidirectional mechanical converting unit according to claim 2, wherein the capstan gear, the follower gear and the idle gear are bevel gears.]

[4. A bidirectional mechanical converting unit according to claim 3, wherein the transmission structure includes two idle gear axles perpendicular to the main shaft; two idle gears are disposed on the idle gear axles and engaged with the capstan gear and the follower gear together, so that the capstan gear and the follower gear rotate in opposite directions.]

[5. A bidirectional mechanical converting unit according to claim 3, wherein the main shaft has at least one profiled surface, through which the reversing assembly engages with the main shaft.]

[6. A bidirectional mechanical converting unit according to claim 5, wherein the main shaft has a plurality of profiled surfaces.]

[7. A bidirectional mechanical converting unit according to claim 6, wherein the main shaft has three profiled surfaces.]

[8. A bidirectional mechanical convening unit according to claim 5, wherein the at least one profiled surface of the main shaft is configured into two segments, which are corresponding to the two driving elements, respectively.]

[9. A bidirectional mechanical converting unit according to claim 5, wherein the reversing assembly sleeved on the main shaft includes a reversing element and two sets of rolling elements; wherein the reversing element is sleeved on the main shaft coaxially in clearance fitting, two sets of slots whose dimensions are slightly larger than those of the rolling elements are disposed on the reversing element for receiving the two sets of rolling elements respectively, positions of which are corresponding to positions of the two driving elements;

each one of the two driving elements has an inner circumference, through which the driving elements are sleeved on the reserving element coaxially in clearance fitting, respectively;

each set of the rolling elements includes at least one rolling element, which can roll on the profiled surface;

the rolling element can be pushed with the two sets of slots of the reversing element to engage with the profiled surface and the inner circumference together;

wherein the one-way clutch is formed through the rolling elements engaging with the profiled surface and the inner circumference together.]

[10. A bidirectional mechanical converting unit according to claim 9, wherein the inner circumferences are cylinder surfaces, the rolling elements are cylinder rolling needles, and the axes of the rolling needles are parallel to the axis of the main shaft.]

[11. A bidirectional mechanical converting unit according to claim 9, wherein the inner circumferences are frustoconical surfaces, the rolling elements are conical rolling shafts, and the profiles of the rolling shafts are matched with gaps between the profiled surface and the inner circumferences.]

[12. A bidirectional mechanical converting unit according to claim 9, wherein the inner circumferences are cylinder surfaces or annular surfaces, and the rolling elements are rolling balls.]

[13. A bidirectional mechanical converting unit according to claim 9, wherein a radial gap is formed between the profiled surface and the inner circumference, wherein dimension of middle portion of the gap is larger than diameters of the rolling elements, and dimensions of both end portions of the radial gap are smaller than the diameters of the rolling elements.]

[14. A bidirectional mechanical converting unit according to claim 13, wherein the profiled surface is a cylindrical surface, an elliptic cylindrical surface, a paraboloid or a plane.]

[15. A bidirectional mechanical converting unit according to claim 9, wherein number of the rolling elements within one set of the two sets of the slots of the reversing element equals to number of the profiled surface.]

[16. A bidirectional mechanical converting unit according to claim 15, wherein number of the rolling elements within each set of the two sets of the slots of the reversing element equals to number of the profiled surface.]

[17. A bidirectional mechanical converting unit according to claim 9, wherein number of the rolling elements within one set of the two sets of the slots of the reversing element is larger than number of the profiled surface.]

[18. A bidirectional mechanical converting unit according to claim 9, wherein number of the rolling elements within one set of the two sets of the slots of the reversing element is smaller than number of the profiled surface.]

[19. A bidirectional mechanical converting unit according to claim 9, wherein the reversing element can be switched between two predetermined positions around circumference of the main shaft, to set rotation direction of the main shaft through changing position relationship between the profiled surface and the rolling elements.]

[20. A bidirectional mechanical converting unit according to claim 3, wherein two pawl seats are disposed on the main shaft in positions corresponding to the two driving elements; a pair of opposite swinging pawls is disposed on each of the pawl seats symmetrically;

the two driving elements are provided at least partially annularly with a toothed inner circumference which can engage with at least one of the pawls;

the reversing assembly is sleeved on the main shaft, and positioning of the pawls can be controlled, to set rotation direction of the main shaft through changing the positioning of the pawls.]

[21. A bidirectional mechanical converting unit according to claim 20, wherein the reversing assembly includes a reversing element sleeved on the main shaft coaxially in clearance fitting;

the reversing element have openings through which the pawls can engage with the toothed inner circumference;

at least one end of the openings around circumference of the main shaft is used for pushing the pawls, to control the positioning of the pawls;

wherein the one-way clutch is formed through the pawls engaging with the toothed inner circumference.]

[22. A bidirectional mechanical converting unit according to claim 21, wherein the reversing element can be switched between two predetermined positions around circumference of the main shaft, to set rotation direction of the main shaft through changing the positioning of the pawls.]

[23. A bidirectional mechanical converting unit according to claim 20, wherein an elastic element is disposed between each pair of the pawls to keep the pawls diverging against the toothed inner circumference.]

[24. A bidirectional mechanical converting unit according to claim 20, wherein the toothed inner circumference is an inner ratchet circumference.]

[25. A bidirectional mechanical converting unit according to claim 3, wherein two sets of slots are disposed at positions on a circumference of the main shaft corresponding to positions of the two driving elements, each set of slots including two slots;

a detent urged outwards by an elastic element is disposed in each slot, the two driving elements are provided with a toothed inner circumference distributed annularly which can engage with at least one of the detents;

the reversing assembly is sleeved on the main shaft, and positioning of the detents can be controlled, to set rotation direction of the main shaft through changing the positioning of the detents.]

[26. A bidirectional mechanical converting unit according to claim 25, wherein the reversing assembly includes a reversing element sleeved on the main shaft coaxially in clearance fitting;

the reversing element have openings through which the detents can engage with the toothed inner circumference;

at least one end of the openings around circumference of the main shaft is used for pushing the detents, to control the positioning of the detents;

wherein the one-way clutch is formed through the detents engaging with the toothed inner circumference.]

[27. A bidirectional mechanical converting unit according to claim 26, wherein the reversing element can be switched between two predetermined positions around circumference of the main shaft, to set rotation direction of the main shaft through changing the positioning of the detents.]

[28. A bidirectional mechanical converting unit according to claim 25, wherein an outer end of the detent is flat.]

[29. A bidirectional mechanical converting unit according to claim 25, wherein an outer end of the detent includes an inclined surface matching with the toothed inner circumference.]

[30. A bidirectional mechanical converting unit according to claim 1, wherein the two driving elements are a first spur gear and a second spur gear; the transmission structure includes:

a first axle and a second axle disposed parallel to and in a predetermined space-apart relationship with the main shaft;

a third spur gear and a fourth spur gear affixed on opposite ends of the first axle and the second axle respectively, so that the third spur gear intermeshes with the first spur gear and the fourth spur gear intermeshes with the second spur gear; and a fifth spur gear affixed to center of the first axle and a sixth spur gear affixed to center of the second axle, wherein the fifth spur gear intermeshes with the sixth spur gear.]

[31. A bidirectional mechanical converting unit according to claim 1, wherein one of the driving elements is a first spur gear, the other of the driving elements is a first pulley; the transmission structure includes:

an axle disposed parallel to and in a predetermined space-apart relationship with the main shaft;

a second spur gear and a second pulley affixed on opposite ends of the axle, the second spur gear intermeshes with the first spur gear on one side of the main shaft, and the second pulley is positioned for being driven by the first pulley via a belt;

a belt coupling the first pulley with the second pulley.]

[32. A bidirectional mechanical converting unit according to claim 1, wherein the two driving elements are a first pulley and a second pulley; the transmission structure includes:

a first axle and a second axle which are disposed parallel to and in a predetermined space-apart relationship with the main shaft;

a third pulley and a fourth pulley affixed on opposite ends of the first axle and the second axle respectively, so that the third pulley is positioned for being driven by the first pulley via a first belt and the fourth pulley is positioned for being driven by the second pulley via a second belt; and a first spur gear affixed to center of the first axle and a second spur gear affixed to center of the second axle, wherein the first spur gear intermeshes with the second spur gear.]

[33. A bidirectional mechanical converting unit according to claim 1, wherein the two driving elements are a first 3D pulley and a second 3D pulley; the transmission structure includes:

an axle disposed in a plane perpendicular to and in a predetermined space-apart relationship to the main shaft;

a third 3D pulley and a fourth 3D pulley which are mounted on opposite ends of the axle; and a 3D belt coupling the first, the second, the third and the fourth pulleys.]

[34. A bidirectional mechanical converting unit according to claim 19, wherein two orientation portions which correspond to the two positions of the reversing element are disposed on the reversing element, so as to set the rotation direction of the main shaft.]

[35. A bidirectional mechanical converting unit according to claim 34, wherein the two orientation portions on the reversing element includes two orientation slots for setting clockwise or counterclockwise rotation of the main shaft correspondingly, the main shaft includes an orientation ball supported by a spring which can be positioned in either of the two orientation slots, so as to set the main shaft to rotate in clockwise or counterclockwise direction.]

[36. A bidirectional mechanical converting unit according to claim 34, further comprising:

a push button assembly disposed on the main shaft, wherein the push button assembly can slide along a direction parallel to the axis of the main shaft, but can not rotate relative to the main shaft around circumference of the main shaft;

a helical sliding slot disposed on the reversing element, wherein the push button assembly further slidably engages with the sliding slot, so as to convert a linear movement of the push button assembly along the direction parallel to the axis of the main shaft to a circular movement of the reversing element relative to the main shaft, so that the reversing element switches between the two positions to set the rotation direction of the main shaft.]

[37. A bidirectional mechanical converting unit according to claim 36, wherein further includes a head cap fixedly connected to the main shaft, a slideway parallel to the axis of the main shaft is disposed on the head cap; the push button assembly is slidably disposed on the slideway.]

[38. A bidirectional mechanical converting unit according to claim 19, wherein the transmission structure includes a transmission seat, on which the at least one idle gear axle is disposed perpendicularly to the main shaft, the transmission seat is sleeved on the reversing element coaxially in clearance fitting; and the transmission seat is fastened to a mounting assembly.]

[39. A bidirectional mechanical converting unit according to claim 38, wherein the mounting assembly is a holding ring.]

[40. A bidirectional mechanical converting unit according to claim 38, wherein the mounting assembly is a supporting frame.]

[41. A manual tool, comprising a bidirectional mechanical converting unit according to claim 1, wherein the rotation assembly is a handle, the main shaft rotates in a predetermined direction to output torque, and the predetermined direction can be reversed.]

[42. A manual tool according to claim 41, wherein a tool head is disposed on the main shaft to make the manual tool a screwdriver, a manual drill or a torque wrench.]

[43. A manual tool according to claim 42, wherein the tool head is a bit holder for mounting a variety of tool bits.]

[44. A manual tool, comprising a bidirectional mechanical converting unit according to claim 36, wherein the rotation assembly is a handle, the main shaft rotates in a predetermined direction to output torque, and the predetermined direction can be reversed, a tool head is disposed on the main shaft to make the manual tool a screwdriver, a manual drill or a torque wrench, and the tool head is a bit holder for mounting a variety of tool bits.]

[45. A manual tool, comprising a bidirectional mechanical converting unit according to claim 39, wherein the rotation assembly is a handle, the main shaft rotates in a predetermined direction to output torque, and the predetermined direction can be reversed, a tool head is disposed on the main shaft to make the manual tool a screwdriver, a manual drill or a torque wrench, and the tool head is a bit holder for mounting a variety of tool bits.]

*46. A bidirectional mechanical converting unit, comprising:*

*a main shaft;*

*a driving means and a reversing means which are coupled to each other; and*

*a rotation means for inputting torque, a rotation axis of the rotation means being coaxial with the main shaft; the driving means comprises a capstan gear, a follower gear, an idle gear and a transmission seat provided with an idle gear axle; the idle gear being disposed on the idle gear axle and coupling both of the capstan gear and the follower gear to transmit, and forcing the capstan gear and the follower gear to rotate in opposite directions;*

*one of the capstan gear and the follower gear entrains the main shaft to rotate in a predetermined direction, wherein*

*the predetermined direction can be switched via the reversing means;*

*wherein the driving means is sleeved on the reversing means;*

*the reversing means includes two one-way clutches;*

*through the two one-way clutches, when the torque input by the rotation means for inputting torque being same with or opposite to the predetermined direction, the main shaft always rotates in the predetermined direction.*

*47. A bidirectional mechanical converting unit according to claim 46, wherein*

*the reversing means includes a reversing element;*

*the reversing element has openings, a component of the one-way clutch is positioned in corresponding one of the openings.*

*48. A bidirectional mechanical converting unit according to claim 47, wherein the reversing element is configured to be coaxial with the main shaft.*

*49. A bidirectional mechanical converting unit according to claim 47, wherein the reversing means includes an orientation ball which can be positioned in any one of orientation slots disposed on the reversing element, so as to set the predetermined direction.*

*50. A bidirectional mechanical converting unit according to claim 46, wherein any one of the two one-way clutches is formed by an inner ratchet circumference and a pawl.*

*51. A bidirectional mechanical converting unit according to claim 50, wherein the inner ratchet circumference is disposed on the capstan gear and the follower gear.*

*52. A bidirectional mechanical converting unit according to claim 50, wherein the predetermined direction is set by changing an engagement status of the inner ratchet circumference and the pawl.*

*53. A bidirectional mechanical converting unit according to claim 52, wherein the reversing element can be switched between two predetermined positions around the circumference of the main shaft, to set the predetermined direction by changing an engagement status of the inner ratchet circumference and the pawl.*

*54. A screwdriver, comprising:*

*a main shaft;*

*a handle, the handle is coaxial with the main shaft;*

*a driving means and a reversing means which are coupled to each other; and*

*the driving means comprises a capstan gear, a follower gear, an idle gear and a transmission seat provided with an idle gear axle; the idle gear being disposed on the idle gear axle and coupling both of the capstan gear and the follower gear to transmit, and forcing the capstan gear and the follower gear to rotate in opposite directions;*

*one of the capstan gear and the follower gear entrains the main shaft to rotate in a predetermined direction, wherein*

*the predetermined direction can be switched via the reversing means;*

*wherein the driving means is sleeved on the reversing means;*

*the reversing means includes two one-way clutches;*

*through the one-way clutches, when the torque input by the rotation means for inputting torque being same with or opposite to the predetermined direction, the main shaft always rotates in the predetermined direction.*

*55. A screwdriver according to claim 54, wherein the reversing means includes a reversing element;*

*the reversing element has openings, a component of a one-way clutch is positioned in corresponding one of the openings.*

*56. A screwdriver according to claim 55, wherein the reversing element is configured to be coaxial with the main shaft.*

*57. A screwdriver according to claim 55, wherein the reversing means includes an orientation ball which can be positioned in any one of orientation slots disposed on the reversing element, so as to set the predetermined direction.*

*58. A screwdriver according to claim 54, wherein any one of the two one-way clutches is formed by an inner ratchet circumference and a pawl.*

*59. A screwdriver according to claim 58, wherein the inner ratchet circumference is disposed on the capstan gear and the follower gear.*

*60. A screwdriver according to claim 58, wherein the predetermined direction is set by changing an engagement status of the inner ratchet circumference and the pawl.*

*61. A screwdriver according to claim 60, wherein the reversing element can be switched between two predetermined positions around the circumference of the main shaft, to set the predetermined direction by changing engagement status of the inner ratchet circumference and the pawl.*

* * * * *